(12) United States Patent
D'Amore et al.

(10) Patent No.: US 12,225,108 B2
(45) Date of Patent: Feb. 11, 2025

(54) STRANDED BLOCKCHAIN

(71) Applicants: Brandon E. D'Amore, Sherman Oaks, CA (US); Gregory A. Piccionelli, Westlake Village, CA (US); Joel P. Thatcher, Oroville, WA (US)

(72) Inventors: Brandon E. D'Amore, Sherman Oaks, CA (US); Gregory A. Piccionelli, Westlake Village, CA (US); Joel P. Thatcher, Oroville, WA (US)

(*) Notice: Subject to any disclaimer, the term of this patent is extended or adjusted under 35 U.S.C. 154(b) by 106 days.

(21) Appl. No.: 16/974,271

(22) Filed: Dec. 14, 2020

(65) Prior Publication Data

US 2022/0191005 A1    Jun. 16, 2022

(51) Int. Cl.
| | |
|---|---|
| H04L 29/06 | (2006.01) |
| G06F 16/21 | (2019.01) |
| H04L 9/06 | (2006.01) |
| H04L 9/32 | (2006.01) |
| H04L 9/00 | (2022.01) |

(52) U.S. Cl.
CPC .......... *H04L 9/0643* (2013.01); *G06F 16/219* (2019.01); *H04L 9/3297* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 2013/0173714 A1* | 7/2013 | D'Amore | ............ | G06Q 10/101 709/205 |
| 2015/0339020 A1* | 11/2015 | D'Amore | ............... | G06Q 10/06 715/753 |
| 2015/0347971 A1* | 12/2015 | D'Amore | ............ | G06Q 10/101 705/300 |
| 2016/0028552 A1* | 1/2016 | Spanos | ................. | H04L 9/3242 713/178 |
| 2019/0035014 A1* | 1/2019 | Bell | ....................... | G06Q 40/00 |
| 2019/0303935 A1* | 10/2019 | Cantrell | ............... | H04L 9/3239 |
| 2020/0019288 A1* | 1/2020 | D'Amore | ............ | H04L 9/3239 |
| 2020/0143323 A1* | 5/2020 | Jiang | ....................... | H04L 63/12 |
| 2020/0184739 A1* | 6/2020 | Nathan | .................. | G06Q 10/20 |
| 2020/0356969 A1* | 11/2020 | Cho | ...................... | G06Q 20/145 |
| 2020/0374128 A1* | 11/2020 | Kurian | .................. | H04L 9/3236 |
| 2021/0026740 A1* | 1/2021 | Guo | ...................... | G06Q 20/382 |
| 2021/0092185 A1* | 3/2021 | DeRosa-Grund | ....... | G06F 16/27 |
| 2021/0216527 A1* | 7/2021 | Huang | ................ | G06F 16/2365 |
| 2021/0406250 A1* | 12/2021 | Novo Diaz | ......... | G06F 16/2379 |

* cited by examiner

*Primary Examiner* — Shin-Hon (Eric) Chen
*Assistant Examiner* — Hassan A Hussein
(74) *Attorney, Agent, or Firm* — Gregory B. Gulliver

(57) ABSTRACT

A Smartblock that has at least two Blockchains that originates from it and terminates at a second Smartblock to create a Blockstrand where the blocks of the Blockchains contain data that is public, semi-private, or private and enable secure collaboration with the control and security provided for the collaborative work via the blocks of the Blockstrand.

8 Claims, 11 Drawing Sheets

STRANDED BLOCKCHAIN

RELATED APPLICATIONS

This application claims priority to the U.S. Provisional Patent application, Ser. No. 62/711,058, titled "Stranded Blockchain," filed on Jul. 27, 2018, and incorporated fully herein.

This application is also a continuation-in-part and claims priority to U.S. patent application Ser. No. 15/926,045 filed on Mar. 20, 2018, titled "SYSTEMS AND METHODS OF CREATIVE WORK COLLABORATIVE SYSTEMS", which is incorporated herein by reference in its entirety, and is a continuation of U.S. patent application Ser. No. 14/817,156 filed Aug. 3, 2015, entitled "SYSTEMS AND METHODS OF CREATIVE WORK COLLABORATIVE SYSTEMS", which is incorporated herein by reference in its entirety, and which is a continuation-in-part of U.S. patent application Ser. No. 14/004,149 filed Sep. 9, 2013, which is incorporated herein by reference in its entirety, and which is a U.S. National Stage of PCT Application No. PCT/US2012/072176, filed Dec. 28, 2012, which is incorporated herein by reference in its entirety and which relates to and claims the benefit of U.S. Provisional Application 61/581,585, filed Dec. 29, 2011 and entitled "CREATIVE WORK COLLABORATIVE SYSTEM", and U.S. Provisional Application 61/733,801, filed Dec. 5, 2012 and entitled "CREATIVE WORK COLLABORATIVE SYSTEM", the entirety of each is hereby incorporated by reference. This application is also a continuation-in-part of U.S. patent application Ser. No. 14/718,003 filed May 20, 2015, which is a divisional application of U.S. patent application Ser. No. 14/004,149 filed Sep. 9, 2013, which is incorporated herein by reference in its entirety, and which is a U.S. National Stage of PCT Application No. PCT/US2012/072176, filed Dec. 28, 2012, which is incorporated herein by reference in its entirety and which relates to and claims the benefit of U.S. Provisional Application 61/581,585, filed Dec. 29, 2011 and entitled "CREATIVE WORK COLLABORATIVE SYSTEM", and U.S. Provisional Application 61/733,801, filed Dec. 5, 2012 and entitled "CREATIVE WORK COLLABORATIVE SYSTEM", the entirety of each is hereby incorporated by reference. This application is also a continuation-in-part of U.S. patent application Ser. No. 14/719,300 filed May 21, 2015, which is a continuation-in-part of U.S. patent application Ser. No. 14/004,149 filed Sep. 9, 2013, which is incorporated herein by reference in its entirety, and which is a U.S. National Stage of PCT Application No. PCT/US2012/072176, filed Dec. 28, 2012, which is incorporated herein by reference in its entirety and which relates to and claims the benefit of U.S. Provisional Application 61/581,585, filed Dec. 29, 2011 and entitled "CREATIVE WORK COLLABORATIVE SYSTEM", and U.S. Provisional Application 61/733,801, filed Dec. 5, 2012 and entitled "CREATIVE WORK COLLABORATIVE SYSTEM", the entirety of each is hereby incorporated by reference.

TECHNICAL FIELD

The present invention relates generally to blockchain data management and more particularly to stranded blockchain data management.

BACKGROUND

A Blockchain is an open, distributed ledger that can record transactions between two parties efficiently and in a verifiable and permanent way. A blockchain is a continuously growing list of records, called blocks, which are linked and secured using cryptography. Each block typically contains a cryptographic hash of the previous block, timestamp and transaction data. By design, a blockchain is inherently resistant to modification of the data. For use as a distributed ledger, a blockchain is typically managed by a peer-to-peer network collectively adhering to a protocol for inter-node communication and validating new blocks. Once recorded, the data in any given block cannot be altered retroactively without the alteration of all subsequent blocks.

"Blocks" on a blockchain are made up of digital pieces of information and typically have three parts:

1) Information about transactions, such as date, time, and dollar amount of transaction.
2) Information about who is participating in transactions, such as the identity of parties (instead of using actual names, unique "digital signatures," sort of like username is used).
3) Information that distinguishes them from other blocks, each block stores a unique code called a "hash" that allows us to tell it apart from every other block.

A typical single block on the blockchain may store up to 1 MB of data. Depending on the size of the data, that means a single block can house a few thousand transactions under in one block. When a block stores new data it is added to the blockchain. Blockchain, as its name suggests, consists of multiple blocks strung together. In order for a block to be added to the blockchain, however, four things must happen: A transaction must occur or data generated to be stored in the blockchain.

1) That transaction must be verified, however, that job is left up to a network of computers for blockchains. These networks often consist of thousands (or in the case of Bitcoin, about 5 million spread across the globe) computers.
2) That transaction or data must be stored in a block. After your transaction or data has been verified as accurate, (i.e. transaction's dollar amount, your digital signature, and other parties' digital signature) they are all stored in a block. There, the transaction will likely join hundreds, or thousands, of others like it.
3) That block must be given a hash. Not unlike an angel earning its wings, once all of a block's transactions have been verified, it must be given a unique, identifying code called a hash. The block is also given the hash of the most recent block added to the blockchain. Once hashed, the block can be added to the blockchain. When that new block is added to the blockchain, it becomes publicly available for anyone to view. If you take a look at BITCOIN's blockchain, you will see that you have access to transaction data, along with information about when ("Time"), where ("Height"), and by who ("Relayed By") the block was added to the blockchain.

Anyone can view the contents of the blockchain, but users can also opt to connect their computers to the blockchain network. In doing so, their computer receives a copy of the blockchain that is updated automatically whenever a new block is added, sort of like a Facebook News Feed that gives a live update whenever a new status is posted.

Each computer in the blockchain network has its own copy of the blockchain. Although each copy of the blockchain is identical, spreading that information across a network of computers makes the information more difficult to manipulate. With blockchain, there isn't a single, definitive account of events that can be manipulated. Instead, a hacker would need to manipulate every copy of the blockchain on the network.

Looking over the Bitcoin blockchain, however, you will notice that you do not have access to identifying information about the users making transactions. Although transactions on the blockchain are not completely anonymous, personal information about users is limited to their digital signature or username.

Blockchain technology accounts for security and trust in several ways. First, new blocks are always stored linearly and chronologically. That is, they are always added to the "end" of the blockchain.

After a block has been added to the end of the blockchain, it is very difficult to go back and alter the contents of the block. That's because each block contains its own "hash," along with the "hash" of the block before it. Hash codes are created by a math function that turns digital information into a string of numbers and letters. If that information is edited in any way, the hash code changes as well.

In order to change a single block, a hacker would need to change every single block after the changed bock on the blockchain. Recalculating all those hashes would take an enormous and improbable amount of computing power. In other words, once a block is added to the blockchain it becomes very difficult to edit and impossible to delete.

To address the issue of trust, blockchain networks have implemented tests for computers that want to join and add blocks to the chain. The tests, called "consensus models," require users to "prove" themselves before they can participate in a blockchain network. One of the most common examples is called "proof of work."

In the "proof of work" system, computers must "prove" that they have done "work" by solving a complex computational math problem. If a computer solves one of these problems, they become eligible to add a block to the blockchain. But the process of adding blocks to the blockchain, what the cryptocurrency world calls "mining," is not easy. In fact, the odds of solving one of these problems on the BITCOIN network were about 1 in 5.8 trillion. To solve complex math problems at those odds, computers must run programs that cost them significant amounts of power and energy.

Proof of work does not make attacks by hackers impossible, but it does make them somewhat useless. If a hacker wanted to coordinate an attack on the blockchain, they would need to solve complex computational math problems at 1 in 5.8 trillion odds just like everyone else. The cost of organizing such an attack would almost certainly outweigh the benefits.

Public and private encryption keys are used with creating the hashes used, such as the ELI5 version of public and private keys. You can think of a public key as a school locker and the private key as the locker combination. People can insert letters and notes through the opening in your locker. However, the only person that can retrieve the contents of the mailbox is the one that has the unique key. If a user misplaces their private key, they will lose access to their data.

In a typical blockchain network, the blockchain is not only shared and maintained by a public network of users—but it is also agreed upon. When users join the network, their connected computer receives a copy of the blockchain that is updated whenever a new block is added. But what if, through human error or the efforts of a hacker, one user's copy of the blockchain manipulated to be different from every other copy of the blockchain?

The blockchain protocol discourages the existence of multiple blockchains through a process called "consensus." In the presence of multiple, differing copies of the blockchain, the consensus protocol will adopt the longest chain available. More users on a blockchain mean that blocks can be added to the end of the chain quicker. By that logic, the blockchain of record will always be the one that most users trust. The consensus protocol is one of blockchain technology's greatest strengths but also allows for one of its greatest weaknesses.

Uses for traditional blockchains include health care providers can leverage blockchain to securely store their patients' medical records. When a medical record is generated and signed, it can be written into the blockchain, which provides patients with the proof and confidence that the record cannot be changed. These personal health records could be encoded and stored on the blockchain with a private key, so that they are only accessible by certain individuals, thereby ensuring privacy.

The continuous addition of blocks results in additional processing time and power needed to process the blocks/blockchain as the data contained in the blockchain grows and is altered. Also, a limitation to traditional blockchains is their linearity or near linearity of the connected blocks.

Thus, the problem with the advent and use of a blockchain to securely store data such as digital currency, agreements, inventories, etc. the limitations of a single blockchain has become apparent. With more and more processing power being needed to process the data of longer and longer blockchains as well of the limitations of storing limited dynamic information in a blockchain is has become apparent that a new system is needed.

What is needed is an approach for a blockchain to be less linear while increasing the processability of the blocks/blockchain that includes an approach to prune or drop off blocks while maintaining the inherent security of the blockchain.

SUMMARY

An approach for the generation of Smartblocks that anchor multiple blockchains and, after one or more predetermined events, such as the elapse of an amount of time, closing of a CW to further collaboration, etc., and the re-anchoring the blockchains. Creating security for multiple related blockchains and enabling, under specified conditions, the pruning of blockchains or limiting of the size of blockchains between Smartblocks.

Recording property rights (real and intellectual) is both burdensome and inefficient. Today, a physical deed must be delivered to a government employee at the local recording office, where is it manually entered into the county's central database and public index. In the case of a property dispute, claims to the property must be reconciled with the public index. This process is not just costly and time-consuming—it is also riddled with human error, where each inaccuracy makes tracking property ownership less efficient. Blockchain with Smartblocks has the potential to eliminate the need for scanning documents and tracking down physical files in a local recording office. If property ownership is stored and verified on the blockchain, owners can trust that their deed is accurate and permanent. A stranded blockchain can be created that has a strand for recording property rights for single-family homes, multi-family home structures, and commercial structures.

A smart contract is a computer code that can be built into the blockchain using Smartblocks to facilitate, verify, or negotiate a contract agreement. Smart contracts operate under a set of conditions that users agree to. When those conditions are met, the terms of the agreement are automatically carried out. A stranded blockchain can be used to record different types of contracts, locations, or other commonality shared by contract groups.

Suppliers can use Smartblocks with blockchain to record the origins of materials that they have purchased. This would allow companies to verify the authenticity of their products, along with health and ethics labels like "Organic," "Local," and "Fair Trade." The tracking of the path and safety of food throughout the farm-to-user journey may also be recorded in a blockchain. Strands of blockchains may be associated with a production date, facility, or similar grouping approaches.

Voting with Smartblock blockchain carries the potential to eliminate election fraud and boost voter turnout. Each vote would be stored as a block on the blockchain, making them nearly impossible to tamper with. Each precinct or voting area could be a strand in the stranded blockchain. The blockchain protocol would also maintain transparency in the electoral process, reducing the personnel needed to conduct an election and provide officials with instant results. An additional strand between the Smartblocks can contain a blockchain of voter registration information.

Other devices, apparatus, systems, methods, features, and advantages of the invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
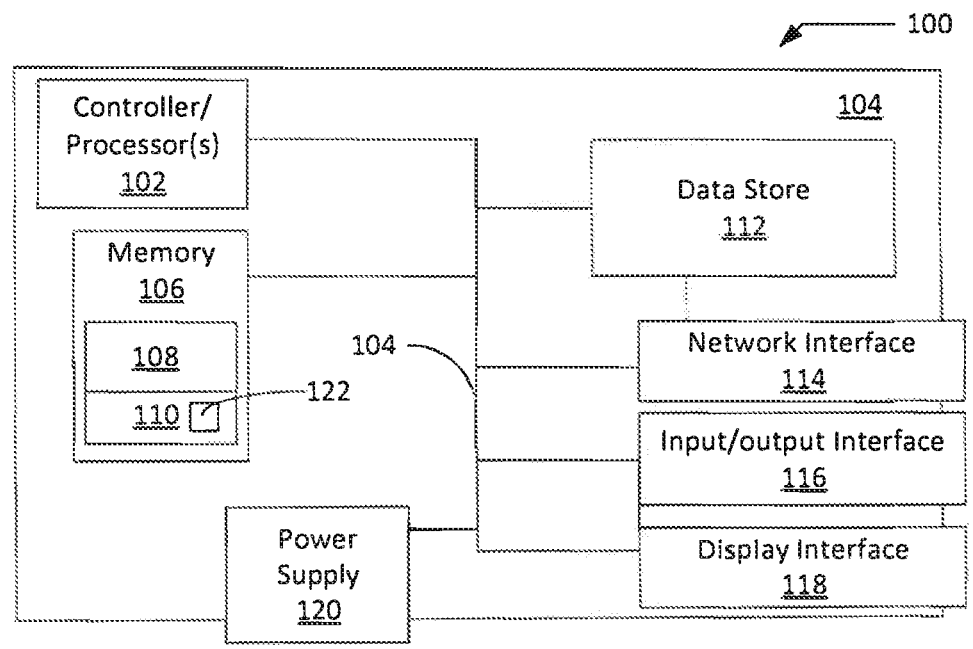
FIG. 1 is block diagram 100 of the computer/server 104 that processes/access Blockstrands and Blockchains in accordance with an example implementation of the invention.

The disclosed approach referred to herein as "Blockstrand" is an approach whereby a multiplicity of Blockchains are tried together using dynamic Smartblocks (Genesisblocks) creating a strand of Blockchains that can dynamically expand and be put into one or more Blockstrands. Anytime two or more Blockchains are tied together using a Genesisblock and closed at predetermined intervals a Blockstrand is created.

We provide the following definitions for certain capitalized terms used in the following disclosure. Additionally, other capitalized terms in this disclosure, not defined below, shall have the same meanings for those terms set forth in U.S. Pat. Nos. 8,706,809 and 9,100,444, and U.S. patent application Ser. Nos. 14/719,300, 14/817,156, 13/668,304, 13/815,739, 13/644,094, 13/815,824, 13/815,837 and 09/812,296 (including without limitation, the full text of each and all provisional patent applications that the foregoing patent disclosures include by reference), each and all of which disclosures are fully incorporated by reference as though set forth in full herein.

Definitions

The terms below, and terms incorporated from the aforementioned listed patents and patent applications, and grammatical variations thereof, shall have the meanings provided. Notwithstanding and not limiting the foregoing, the following definitions as used in this disclosure are intended to be construed broadly so that the meanings will reasonably effectuate the broadest interpretation of all of the parts of this disclosure in which they are used.

Block. A "Block" is one section in a chain (Blockchain) of digitized, decentralized, public ledger of transactions.

Blockchain. A "blockchain" is a digitized, centralized, decentralized, or both centralized and decentralized, public ledger of transactions. This may include but is not limited to crypto-currency, agreements, inventories, etc. This can include programmable Blockchains such as ETHEREUM's Blockchains. It is to be expressly understood that the definition of the term "Blockchain" shall not exclude, but shall also include, all commonly understood definitions of the term "blockchain" or "block-chain" in use or otherwise available to a person of relevant ordinary skill.

Blockstrand. A Blockstrand is comprised of a Genesisblock/Smartblock that links 2 or more Blockchains together into one strand of Blockchains. In some embodiments of the invention, one or more Blockstrands can perform one or more Comparison functions, such as effectively Comparing data, data integrity, code, executory features or other elements of one or more Blocks, Blockchains or Blockstrands to one or more other Block, Blockchains and/or Blockstrands. Such Comparisons, (such as amongst distributed Blockstrands) can be used to effectuate and/or maintain accurate data integrity across Blockchains/Blockstrands distributed networks. In some embodiments, one or more elements, Blocks, Blockchains, and/or segments thereof, housed inside a Blockstrand can be selectively Compared and/or synchronized to other elements, Blocks, Blockchains, and/or segments thereof. For example, where Blockstrand A is distributed across n processors (computers), the information contained in the Genesisblock or one or more following Smartblocks houses instructions regarding which Blocks and/or Blockchains should be Compared for matching data within the distributed Blockstrands. These instructions can range from the speed at which Blocks are added and/or replicated with respect to individual Blockchains and/or how confirmation of such Block and/or Blockchain addition and/or replication is determined and/or recorded. In some embodiments of the invention, a single Blockchain or multiple Blockchains can act singly or in concert as one or more regulators or conductors determining which Blocks and/or Blockchains are added and/or replicate and/or at what speed they are added and/or replicate. The data Comparisons and synchronizing can be comprised of, but are not limited to data comprising or pertaining to timestamps and other chronological data, location data, private information, public information, semi-private information, owner data, user data, instruction data, group data, preferences information, executory information, such as signatures, identity indicia, execution of instructions in accordance with one or more agreements, executions of contracts, verification of rights, payments of royalties, license fees, and other exchanges of value, completion of selected and/or pre-defined tasks, formation of one or more groups or other assemblages, etc. In some embodiments of the invention, the Blocks and/or groups of Blocks within one or more Blockchains and/or Blockstrands can Communicate, including, without limitation, with one or more other Blocks, Blockchains, and/or Blockstrands, including without limitation by means of an API, Soap, REST, Protocol, HTTP, JSON, Libraries, signal transmission, and/or other digital techniques known to persons skilled in the art of computer data transmission. In some embodiments, such Communication is effectuated between one or more Blocks, Blockchains and/or Blockstrands and one or more devices separate from, external to or otherwise extrinsic to the device(s) in or on which such Blocks, Blockchains and/or Blockstrands are stored or are functioning, such as devices configured to receive, respond to, interact with, further, complete, maintain and/or terminate such Communication(s), including without limitation extrinsic digital devices or mechanical devices, such as computers, phones, cars and other vehicles, robotic devices, virtual reality devices, gaming devices, autonomous computing devices, artificial intelligence devices and other devices capable of receiving and/or transmitting digital information. In some embodiments of the invention, a Blockstrand is dynamic and can have Public Blockchains, Private Blockchains and Semi-Private Blockchains in, or associated with, a Blockstrand. In some embodiments of the invention, a Blockstrand can comprise, contain, include, encompass, hold or otherwise incorporate multiple Blockchains in a Blockstrand. In some embodiments a Blockstrand can also comprise, contain, include, encompass, hold or otherwise incorporate multiple independently identifiable or otherwise independently characterized Blockstrands within a larger Blockstrand. A Blockstrand can, therefore, have a combination of Blockchains and Blockstrands within a Blockstrand. In some embodiments, a Blockchain in a Blockstrand can be weighted, in other words it can have a priority characteristic or relativistic value or quality set on the Blockchain making it have a higher value or lower value or other prioritizing characteristics in the Blockstrand compared with or otherwise relative to one or more other Blockchains and/or Blockstrands held, contained or incorporated within a larger Blockstrand. Blocks in a Blockstrand can compare or otherwise interactively use data with other Blocks within or otherwise included in a Blockstrand. In some embodiments of the invention, Blockchains can Compare or otherwise interactively use data with one or more other Blockchains in a Blockstrand. In some embodiments of the invention, Multi-strands can Compare or otherwise interactively use data with other Blockchains and/or other Multi-strands in a Blockstrand. In some embodiments of the invention Blocks or Blockchains in a Blockstrand can Compare or otherwise interactively use data with Blocks or Blockchains outside of the Blockstrand it resides in.

Blockstrand Composite Identity. A Blockstrand Composite Identity is one or more identities associated with a person, entity, device, item, thing or group thereof that results from information, data, and/or patterns thereof contained, included and/or resident in, and/or otherwise associated with, one or more Blockstrands, and/or one or more identities resulting from the operation of one or more Blockstrands.

Brain Mapping. Brain Mapping means, in summary, the study of the anatomy and function of the brain and spinal cord through the use of imaging, immunohistochemistry, molecular & optogenetics, stem cell and cellular biology, engineering, neurophysiology, and nanotechnology. Without limiting the foregoing, "Brain Mapping" also means a set of neuroscience techniques predicated on the mapping of (biological) quantities or properties onto spatial representations of the (human or non-human) brain resulting in maps.

Compare, Comparison, and Comparing (and derivatives thereof). The terms "Compare," "Comparison," and "Comparing" (and derivatives thereof) mean the process of determining, measuring, noting, valuing, and/or estimating or otherwise comparing the similarity of data and/or other determinable information or other matter to other data, information and/or determinable matter, where such data, information or other determinable matter shall be construed broadly to mean anything that is comparable digitally or by any other means of comparison, including without limitation by means of computer-assisted comparison, operation of one or more autonomous computing devices to perform such comparison(s), use of one or more artificial intelligence devices to perform such comparison(s). Without limiting the foregoing the terms "Compare," "Comparison," "Comparing" (and derivatives thereof) shall also include any means of effectuating a comparison of any quantifiable item or other matter to one or more other quantifiable items or other matters.

Communicate and Communication (and derivatives thereof). "Communicate" and "Communication" means data transmission and/or reception by and/or between devices, such as by and between computers, autonomous computer devices, artificial intelligence devices, robots and/or other digital devices or digitally enabled devices effectuated by, through or in association with any known means of data or other information communication by and/or between such devices, including without limitation, by transmission between digital device components, transmission over, through or in association with, one or more networks, by wired or wireless means, including without limitation by signal transmission.

Dynamic Block. A Dynamic Block can be a Genesisblock, a Smartblock or an individual Block. A Dynamic Block is a Block that can take instructions, execute instructions or dictate instructions. Without limiting the foregoing, in some embodiments of the invention, for example, where the Dynamic Block comprises one or more Smartblocks, the Smartblock(s) have instructions specifying and/or determining what Blocks and/or Blockchains within their Blockstrand can do, how they will function, etc., as well as what one or more individual Blocks within one or more Blockchains can do or how they will function. In some embodiments of the invention, for example, a Smartblock is configured to provide functional instructions to a Blockchain within a Blockstrand of a plurality of Blockchains that it is to stop replicating prior to other Blockchains in the Blockstrand being completed. Another example of Dynamic Blocks, without limiting the foregoing, is a stock trading transactional Block in which many fast, and near-instant, transactions can be made using Dynamic Blocks within a Blockstrand. Multiple strands in relation to the dictating instruction chain replicate in a delayed manner following the master transaction Blockchain. This creates multiple chains that "echo" the controlling or "dictating" Blockchain, thus creating a series of cascaded, mirrored Blockchains. In some embodiments of the invention, triggers can be set to close the Blockstrand with a Smartblock according to the number of transactions and/or echos that would be allowed to happen within the Blockstrand. In some embodiments, for example, the subject Blockstrand closes itself with the Smartblock and compares itself with other Smartblocks across a network using its predetermined accountability preferences dictating what aspects of its relational Blocks across the network for security.

Dynamic Blockstrand. A "Dynamic Blockstrand" is a digitized, decentralized, public ledger of transactions.

Genesisblock. In preferred embodiments of the invention, one or more Genesisblocks comprise the first, initial or starting Smartblock(s) in one or more Blockstrands or Multi-strands. In some embodiments of the invention one or more Genesisblocks can be created in a centralized or decentralized network.

Identity Verification Engine ("IVE"). The Identity Verification Engine ("IVE") is a system providing functionality whereby an individual, person, group, persons, legal entity, non-human entity, including without limitation, an animal, an artificial intelligence ("AI") entity, a non-human legal entity, and/or an item or group of items can have its/their identity verified by through the use of one or more Blockstrands to store data comprising identification data and/or identification data verification data. In some embodiments of the invention, this data could comprise, but is not limited to, birth certificate copies, birth data, passport copies, passport data, finger print data, educational data (degrees, classes completed, grades, etc.), and/or other biographical information, such as physical characteristic data, job history, etc. Once identity is verified (via one or more processes that provide data indicating that identification data has met a predetermined criterion or set of criteria) the IVE will securely store the verification data and all source records associated with the determination of identity verification in one or more Blocks or Blockstrands. In some embodiments, this information can be retrieved by authorized third parties, including without limitation, in some embodiments, an autonomous computing device, an AI device, a robot, and/or a device executing programming in another Blockstrand. In some embodiments of the invention, the IVE provides the means to enable a person, group, persons, legal entity, non-human entity, including without limitation, an autonomous computing device, an AI entity, and/or an item or group of items functionally capable of communication with IVE to verify and/or validate its/their identity, including through or by providing to the IVE identification verification data, identification source records, identification or other indicia of through but not limited to source records, such as data accessible in an independent database, such as a government records database. In some preferred embodiments, the IVE can be accessed and used by or in association with a CWCS, including without limitation by one or more elements of a CWCS, such as a CCE. In some embodiments, the IVE is used by 3rd parties. In still other embodiments, the IVE can function as a plugin, such as, for example, a plugin feature of a CWCS.

Multi-strand. A plurality of Blockstrands linked via a Smartblock or a plurality of definable Blockstrands or Blockstrand segments contained within a Blockstrand.

Private. "Private" or "Closed" means in association with one or more Blockchains or Blockstrands one or more ledgers created and/or maintained by one or more entities, such as a company or governmental entity utilizing a non-public network, including without limitation by means of computers, servers and/or other digital devices for which public access is prevented or otherwise limited. In some embodiments of the invention a Private Blockchain or Private Blockstrand may be maintained in a single digital environment isolated from a public network. In some embodiments of the invention, a Private Blockstrand could be used to contain sensitive private information including without limitation, genetic data, bio-identification data, such as fingerprint and facial recognition data, medical history data, personal financial data, passwords, and the like.

Public. "Public," when used in association with one or more Blockchains or Blockstrands means a Blockchain or Blockstrand comprising a ledger of synchronized information with public computers. A public computer can be but is not limited to any processor with open, or substantially open, access to the general public. This can include computer devices such as, for example, the computer hosting the Library of Congress website. Without limiting the foregoing, the term "Public" shall also mean any processor or controlled smart devices that aren't owned by or under the effective exclusive control of the creator or owner of the Blockchain or a limited access computer that has been given permission to give certain information/access to the public using Blockchains, one or more Smartblocks, one or more Blockstrands and/or one or more other digital devices on one or more non-private networks generally open to the public or use, including without limitation, information collected from, by, through, in association with one or more publicly accessible databases, such as social network databases, government databases, geo-tracking databases, online photo databases, property ownership databases, academic databases, purchase records and charitable donations. In some embodiments of the invention a "Public" Blockchain or "Public" Blockstrand contains and uses information collected from one or more publicly accessible databases or other collections of digital data, including without limitation, data across social networks, data from geo-tracking database, photographic information, and records of activities, such as purchases, charitable donations, etc. In some embodiments of the invention a Blockchain or Blockstrand comprises a composite identification of a person using information about the person from one or more social networks, personal activity data, interpersonal relationship data, location data regarding where the person has been, purchases history data, online search history data, Internet use data, data from one or more automobiles and other devices used by the person, and other data comprising the person's life experience. In some embodiments of the invention, Blocks in this example that are created and generated based on one or more algorithms that has (have) a threshold related to their social, public, personal activity. In some embodiments, one or more Public Blockstrands are configured to monitor social media and/or other data sources to compile a composite profile of a person. In some embodiments the aforementioned composite is assembled from and/or by the means set forth in U.S. patent application Ser. No. 13/668,304. In some embodiments of the invention the composite assembly of data in one or more Blockchains and/or Blockstrands can be used to assemble a personal history or digital diary, including without limitation, digital diaries of the types disclosed in U.S. patent application Ser. No. 13/668,304. In some embodiments, new Blocks can be created regarding any form of life history data that is publicly available, including without limitation, marriage data, arrest data, court record data, property records data and other city or county records data, etc. The aforementioned aspects of preferred embodiments of the invention exploit the notion that a person is a composite of their actions, activities, interpersonal relationships, locations, and their unique life experience. Thus blocks in some such preferred embodiments are created and generated based on one or more algorithms related to the gathering of a person's social, public, and personal activity.

In some embodiments of the invention a Blockstrand functions to provide a digital composite of a person from specific or aggregated online identity characteristics. Also, a composite of the person, such as an identity composite need not be limited to scraping data from public databases. It could also utilize private databases, including for example, purchased data or even private data from a CWCS In some embodiments of the invention one or more Blockstrands can be used by the IVE by using the Genesisblock general identity preferences or customized user identity preferences. In some embodiments of the invention, an IVE Smartblock can have multiple chains that service multiple identity functions. In some embodiments, identity functions can be gathered by scrapping public information, input of private data, or tracking and recording transactions and interactions with third parties. An Identity Blockstrand can have countless number of chains within it. In some embodiments of the invention one or more Identity Blockstrands can be instructed to close themselves with a Smartblock and reopen themselves with a new Smartblock according to time, events, transactions, etc. In one embodiment of the invention, for example, where the IVE is comprised of 5 Blockchains with 3 Block chains being public, one Blockchain being user input, and one Blockchain being user transactional input. Blockchain 1 may be comprised of, include or be associated with, education information, Block Chain 2 may be comprised of, include or be associated with, governmental information such as passport data, driver's license data, criminal history data, Blockchain 3 may be comprised of social media interaction data or other information; Blockchain 4 may be comprised of user input credit information, banking information, SSN; and Blockchain 5 may be configured to provide the tracking of transactions and purchases based on credit information in Blockchain 4. In this example, the closing of the Blockstrand can be determined by transaction total amounts or transactions over time.

Secure Storage. Secure Storage means a secure storage device including but not limited to a secure, computer, Blockchain, Blockstrand, hardware device (such as a cell phone, thumb drive, hard drive), genetic file, AI, physical location (safe).

Secure Verification Identifier. A Secure Verification Identifier is a type of unique identifier associated with indicia of the identifier, such as a token, etc. Such indicia can be represented in some embodiments of the invention as a secure Blockchain token/badge/avatar, etc. In such embodiments, these tokens can have multiple levels of security/reliability, for example silver, gold, platinum. In such cases, different levels of tokens may be configured to represent levels of reliability and integrity. These levels may be achieved by synchronized data and numbers of successful transactions. In some embodiments of the invention, publicly Compared data may be, how many times a party have been checked onto an airplane, when the person undertook their last driver's license renewal, etc. A Secure Verification Identifier can also be something imprinted on a tangible item, such as a credit card or chip. In some embodiments of the invention a token can be configured to function as a Secure Verification Identifier. In some embodiments of the invention the Secure Verification Identifier comprises an organic indicia of identification, such as a retina tattoo. In some preferred embodiments, the Secure Verification Identifier can be modified in a way that it can be but is not limited to being constructed in a way that is in compliance with government requirements, financial institutional requirements, educational institutional requirements, corporate institutional requirements, and personal requirements.

Semi-Private. "Semi-Private" means in association with one or more Blockchains/Blockstrands one or more ledgers created and/or maintained on a plurality of devices (such as servers) by a select plurality of entities, including without limitation non-human device entities, such as robots or artificial intelligence entities, or groups thereof, across multiple computers, servers or similar devices, whereby access to the ledger(s) is limited to persons or entities, including without limitation non-human device entities, such as robots or artificial intelligence entities, with predefined or otherwise appropriate credentials. In some embodiments of the invention, a Semi-Private Blockchain or Semi-Private Blockstrand could be used to contain sensitive information that is required to be accessed and updated by third party verifiers, including without limitation, for example credit score companies, vendors, banks, etc. In some embodiments of the invention, involving verification of personal identity, the use of a Semi-Private Blockchain or Semi-Private Blockstrand provides an increasingly trustworthy verification of identity as each time identity information is verified a new Block verifying the identity reinforces previous recordation of identity verification. Specifically, in some embodiments, every time information is verified it would create a new Block verifying or further verifying identity and/or selected identity elements. In some other embodiments of the invention, redundant rechecking of identification, such as age verification, can be accomplished through a predetermined automatic limitation of re-verification of identity recordation into one or more Blocks once a predetermined level of sufficient verification has been obtained. In some embodiments of the invention, one or more Semi-Private Blockstrands or part(s) thereof are accessible by one or more entities or devices (including without limitation one or more autonomous computing devices, robots or AI devices) with one or more predetermined authorizing credentials. In some preferred embodiments of the invention a Semi-Private Blockstrand contains information and/or other data that is required to be accessed and updated by third-party verifiers (such as credit score companies, vendors, banks, etc.).

Smartblock. A Smartblock is a type of Block in a Blockstrand. Is a digitized, centralized, decentralized or both centralized and decentralized, Block in the public ledger of transactions and/or events in a Blockstrand. A Smartblock can be a Genesisblock. A Smartblock is programmable. In various embodiments of the invention the creation of new Smartblocks can be created, established and/or triggered by an action by a computer or other digital device corresponding to one or more definable events, including without limitation the occurrence of one or more predetermined time increments (i.e. day, hour, minute, second, etc.), the occurrence of one or more events detected with one or more sensing devices, the occurrence of one or more recurring events, the calculation of one or more predetermined data values, new data added to one or more Blockchains in one or more Blockstrands, the linking or unlinking of one or more Block, Blockchains and/or Blockstrands in one or more Blockstrands to one or more Blocks, Block Chains and/or Blockstrands in one or more other Blockstrands, the creation or modification of a CWCS, one or more other predefined actions in, or associated with, a CWCS or one or more linked CWCSs (including without limitation, the creation or modification of one or more Master Profiles and/or Working Profiles, the creation, uploading or modification of one or more Source Works, Collaborative Works, or ACWs, the satisfaction of one or more group profile criteria for collaboration via a CWCS, one or more actions by one or more Content Controllers, and/or one or more actions by one or more NEs), one or more predefined interactions between (i) one or more humans, (ii) one or more humans and one or more digital devices, including without limitation, computers, robots, artificial intelligence devices, and (iii) two or more digital devices, including without limitation, computers, robots and/or artificial intelligence devices, including without limitation as the result of the playing of one or more games. In some embodiments of the invention one or more Smartblocks can communicate and compare data with one or more other Smartblocks in one or more Blockstrands and/or Multi-strands. In some embodiments, one or more Smartblocks can communicate and compare data with, and/or interact with, one or more other Smartblocks that are not a part of the Blockstrand it/they is/are part of or otherwise associated. In some embodiments of the invention, one or more Smartblocks can determine one or more functions of one or more Blockchains in a Blockstrand and/or one or more Blockchains in one or more Blockstrands. In some embodiments, one or more Smartblocks can functionally determine and/or allocate where data, including without limitation new information, and/or Blocks in one or more Blockchains in one or more Blockstrand is/are saved. In some embodiments of the invention, one or more Smartblocks can functionally determine if one or more Blockchains in one or more Blockstrands and/or Multi-strands is/are Public, Semi-private, Private, and/or comprise another privacy state. In some embodiments of the invention one or more Smartblocks can dynamically make the foregoing functional determination(s) dynamically in accordance with one or more predetermined criteria, including without limitation one or more changes in time, one or more predefined interactions between (i) one or more humans, (ii) one or more humans and one or more digital devices, including without limitation, computers, robots, artificial intelligence devices, and (iii) two or more digital devices, including without limitation, computers, robots and/or artificial intelligent changes in the number and/or identities of participants in one or more CWCSs, one or more changes in one or more Source Works, Collaborative Works, or ACWs, one or more actions by one or more Content Controllers, and/or one or more actions by one or more NEs, changes in the location of one or more persons or devices interacting with one or more devices interacting with one or more Smartblocks and/or one or more Blocks, Blockchains, Blockstrands and/or Multistrands with which the one or more Smartblocks is/are interacting, changes in one or more predetermined activities of one or more artificial intelligence devices changes in regulations pertaining to one or more matters associated with the data acquisition or use of data in one or more Blocks, Blockchains, Blockstrands, or Multistrands with which the one or more Smartblocks are associated. In some embodiments, one or more Smartblocks can compare data in one or more Smartblocks, including without limitation one or more Smartblocks that are in Dimension/Coordinates X, Y and Z in one or more Blockstrands or Multistrands.

Source Records. Source Records means any type of documentation about a person/entity confirming, recognizing or verifying the experience, completion or interaction of the Source Record holder. This could be but is not limited to birth certificate, education degrees, school records, work history, social security number, etc. In some preferred embodiments, Source Records used in association with an IVE will be confirmed by a person, computer, AI, Group, Corporation, Entity, Government for the IVE through but not limited to visual inspection, physical inspection, holographic inspection, comparison with a third-party database inspection, AI inspection, remote device inspection (e.g., through a camera, cell phone or other type of device), use of one or more previous or pre-existing IVE confirmations or Secure Verification Identifiers, etc. In some embodiments Source Records are compared with existing public records, private records, financial records, medical records, government records, criminal records, personal records Embodiments of the invention include without limitation uses of Blockstrands that include without limitation:

Tracking and storing data associated with collaborations, collaborative works, and/or contracts or other agreements associated therewith, including without limitation, Collaborations, Collaborative Works, and ACWs of the types described in in U.S. Pat. Nos. 8,706,809 and 9,100,444, and U.S. patent application Ser. No. 14/719,300 (including without limitation, all provisional patent applications included in the foregoing patent disclosures).

Providing secure means and functionality for automatically executing digitally executable instructions associated with collaborations, collaborative works, and/or contracts or other agreements associated therewith, including without limitation, Collaborations, Collaborative Works, and ACWs of the types described in in U.S. Pat. Nos. 8,706,809 and 9,100,444, and U.S. patent application Ser. No. 14/719,300 (including without limitation, all provisional patent applications included in the foregoing patent disclosures), such as effectuating the closing of one or more Working Profiles and/or Collaborative Works to further collaboration, and executing instructions contractually agreed upon by users of a CWCS, including without limitation the payment of royalties in accordance with contractual terms associated with one or more Collaborative Works.

Providing a secure means of storing and using profile data by the CWCS, such as for, and in association with, the operation of a CCE.

Effectuating the reporting, accounting, tracking and/or payment of obligations, including without limitation, royalty distributions, license fee payments, etc. including without limitation those associated with one or more agreements generated in association with the use of a CWCS. For example, in one exemplary embodiment of the invention where a composition song A is a collaborative effort between John Doe and Jane Doe, each of their respective ownership rights documentation resides in the working profile for song A. To be clear, in some embodiments of the invention, a working profile and/or author info may be stored in one or more Blockstrands. Continuing with the foregoing example, TV Network is member of CWCS along with John and Jane doe. TV Network uses song A, reports the usage to CWCS using the CWCS, the usage is stored in a Usage profile of the TV Network with Blockstrand technology described in the instant invention. In some embodiments, the Blockstrand for Song A may be Compared across the CWCS Network and synchronized with the working profiles of song A for John and Jane Doe. Once the Comparison process is completed (confirming payout obligations) the CWCS Accounting Engine releases payments from the account profile ledger of the TV network to John and Jane Doe song wallets, and synchronizes the accounting payments made between all 3 parties and backs it up in the accounting engine.

Continuing with the foregoing example, in some preferred embodiments of the invention the composition (Song A) that is controlled by the CWCS is used in a Network Television program. The TV Network reports the use of the composition through the CWCS. The CWCS stores records about this usage in the "CWCS General Blockstrand" ledger that records all musical usages on TV Networks. This "CWCS General Blockstrand" is programmed using Smartblocks to create a new Genesisblock and Blockchain that holds the invoice, composer info, rights, agreements, usages, for the composition, in this example we will call it "Song A Blockstrand" that is created on the "Composition's Owners Blockstrand". "Song A Blockstrand" once recorded, Communicates to the User(s) of the compositions' CWCS User Blockstrand. Continuing with the foregoing example, once the TV Network pays for the usage of the composition, the CWCS places money/cryptocurrency received into an escrow account to be distributed to all the writers of the composition. In some preferred embodiments of the invention, the CWCS uses the IVE to verify the writers identity, banking information, rights to the musical composition through the Smartblock/Blockstrand technology described herein. Continuing with the foregoing example, the CWCS next verifies with the IVE that the writer owns 100% of the composer rights. Once this is verified the CWCS creates a new block in the users Usage Blockstrand indicating the musical composition was used by the TV Network. At the same time the CWCS creates an additional block in the users Crypto Currency Blockstrand adding to the ledger the moneys from the escrow account for the usage of the composition in the TV Network program.

Sovereign Profile/Social Network Blockchain/Strand

The sovereign profile is an independent standalone user profiles that uses a blockchain/Blockstrand to house and maintain social media data. The sovereign profile can be moved, unplugged, reattached and organized in clusters. The sovereign profile can be clustered together create many and massive networks. They can attach to each other using a Smartblock, API, or similar device. Similar to the CWCS group profile the Sovereign profile has rules and preferences allowing access and share ability to selective data. An example of a Sovereign profile functioning would be connecting multiple profiles together to create a network or social media group network. These groups can select what type of advertising they would like to allow to be advertised to them. Profiles would have the ability to collect revenue based on network advertising and their popularity. A Sovereign profile can attached and participate in multiple networks. Sovereign profiles and attach or detach from Networks at will, bringing their assets with them wherever they go. It is to be understood that in some embodiments of the invention a Sovereign Profile can be used to describe groups and clusters of people, entities, objects, and other matters, etc.

In FIG. 1, a block diagram 100 of a computer/server 104 that processes/access Smartblock having Blockstrands and Blockchains is depicted in accordance with an example implementation of the invention. The computer/server 104 has a controller/processor 102 coupled to a memory 106, data store 112, network interface 114, input/output interface 116, display interface 118, and power supply 120, all connected via bus 104. The bus 104 is shown as a power/data bus, but in practice, the master building controller 104 may have a plurality of separate buses including data, address, and power. The memory 106 is divided into an operating system memory 208 and application memory 110. The application memory 110 contains instructions, when executed, for processing and storing in application memory 110 and/or the data store 112 Blockstrands 122 having Smartblocks and strands of Blockchains. The data store 112 is depicted as being within the master building controller 104, but in other implementation, the data store 112 may reside externally or even in the network 106 or cloud. It is noted that the Smartblocks and Blockchains that make up the Blockstrands is also distributed to other computers in the network.

Figure 2:
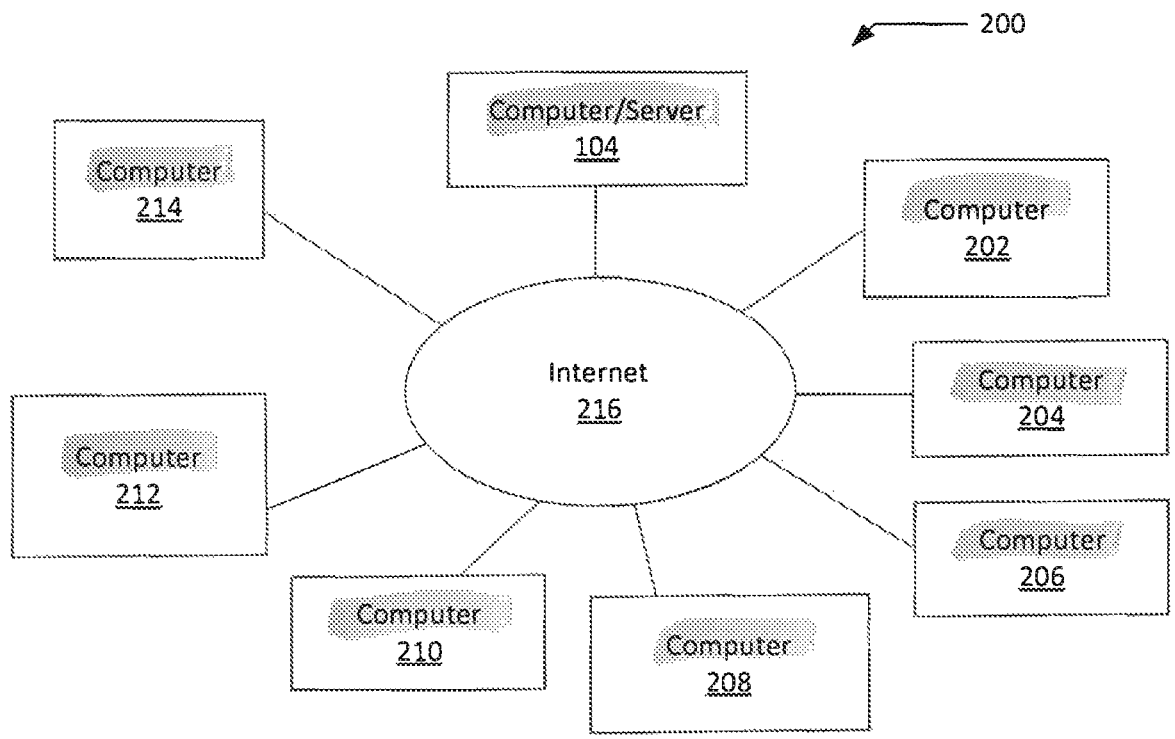
FIG. 2 is a block diagram 200 of a network of computers connected by a network/internet in accordance with an example implementation of the invention.

Turning to FIG. 2, a block diagram 200 of network of computers 102 and 202-214 connected by a network/internet 216 is depicted in accordance with an example implementation of the invention. Each of the computers 102 and 202-214 is able to receive the Stranded Blockchain and add nodes to a Blockchain in a Blockstrand. The computers 102 and 202-214 are also able to manage/create Smartblocks that anchor a Blockstrand. The computers are shown as connected to the internet 216, but in other implementations other types or combination of networks may be used (i.e. 4G, 5G, ISDN, Packet Network).

Figure 3:
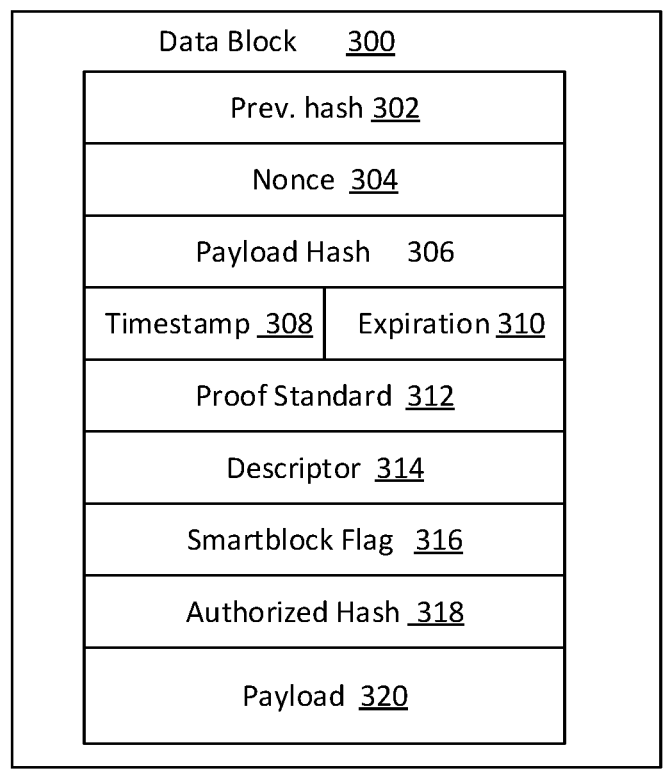
FIG. 3 is a diagram of a data block for use in a Blockstrand 122 of FIG. 1 in accordance with an example implementation of the invention.

FIG. 3 is a diagram of a data block 300 for use in a Blockstrand 122 of FIG. 1 in accordance with an example implementation of the invention. Previous hash 302 is the result of a non-reversible mathematical computation using data from the previous block as the input. According to one embodiment the computation used is a SHA256 hash function. One of ordinary skill in the art would recognize that any suitable hash function could be used without departing from the spirit and scope of the present invention. The hash function is designed so that any change to the data in the previous block results in an unpredictable change in the hash of that block. Previous hash 302 is what creates the link between blocks and Smartblocks, chaining them together to form the Blockstrand.

When calculating the hash 302 for the previous block, it must meet certain criteria defined by data stored as the proof standard 312. In one embodiment, this proof standard 312 is simply a number that the calculated hash must be less than. However, because the output of the hashing function is unpredictable, it cannot be determined, before the hash is calculated, if the input will result in an output that is less than the proof standard 312. The nonce 304 is used to vary the data content of the block, allowing for a large number of different outputs to be produced by the hash function in pursuit of an output that meets the proof standard 312. This makes it computationally expensive to produce a valid block with a nonce 304 that produces a hash value meeting the criteria of the proof standard 312.

The payload hash 306 is a simple hash of the data in the payload 320 and does not have to meet any proof standard. However, the payload hash is included as part of the input when the hash is calculated for the purpose of storing as the previous hash 302 of the next block. The timestamp 308 tells what time the block was created within a certain range of error. According to one embodiment of the present invention, the distributed network of users checks the timestamp 308 against their own known time and will reject any block that seems to have a bogus timestamp 308. The descriptor 314 describes the size and/or data structure of the payload 320. For a variable size payload 320, the descriptor 314 may indicate the index of the first byte in the payload 320 and the size of the payload 320. The descriptor 314 may also store other information relevant to the interpretation of the payload 320.

The Smartblock flag 316 is an indicator used to determine whether a connection to a Smartblock from this block occurs. The authorized hashes 318 indicate which blocks, identified by a hash, are allowed to chain off of this block. According to one embodiment, the authorized hashes 318 are only stored as part of the block if the Smartblock flag 316 is set. In another embodiment, a single authorized hash 318 is present regardless of whether the Smartblock flag 316 is set, but the authorized hash 318 data may be zeroed out or ignored when the Smartblock flag 316 is not set. According to another embodiment, the number of hashes stored as authorized hashes 318 is flexible. The number of authorized hashes 318 stored may be tracked in the descriptor 314, or a flexible data structure for storing authorized hashes 318 may be used to store a variable number of authorized hashes 318.

The payload 320 is the data stored in the data block 300, which may relate to voting, transactions, ownership, data access records, document versioning, or any kind of data that can be stored. The payload 320 may be a fixed size or a flexible size, and provides the input for the hash that produces the payload hash.

One of ordinary skill in the art would recognize there are a variety of different proof standards that could be used. The proof standard could be based on proof of work, such as hash value requirements, proof of stake, such as a key or other indicator of consensus, or any other kind or proof of consensus. The proof standard may be applied as a rule that requires a hash value to be less than the proof standard, more than the proof standard, or have a required bit sequence or a required number of leading or trailing zeroes. Any proof standard may be used without departing from the spirit and scope of the present invention.

The hash algorithms used for the previous hash 302, the payload hash 306, or the authorized hash may be all of the same type or of different types. Hash functions that could be used include MD5, SHA-1, SHA-224, SHA-256, SHA-384, SHA-512, SHA-512/224, SHA-512/256, SHA-3 or any suitable hash function resistant to pre-image attacks. There is also no requirement that a hash be computed only once. The results of a hash function may be reused as inputs into another or the same hash function again multiple times in order to produce a final result. One of ordinary skill in the art would recognize that any hash function could be used to compute the required hashing without departing from the spirit and scope of the present invention.

In the current example, a creative work is a "news article" using a Blockstrand. An online news source company operating News Site A and with a Content Controller, desires to use the CWCS to allow multiple independent public news journalists contribute articles to the online news sources website. In order to maintain a high level of credibility and deter the labeling of content on News Site A as "fake news," the online news source company creates a Working Profile in the CWCS with collaboration preferences that only allow specified independent public news journalists that meet specified criteria to contribute articles to News Site A. In the Working Profile preferences, the company sets the Working Profile functionality of the CWCS to store all information from a journalist obtainable from Blockstrand configured to provide data usable by the Working Profile. The Blockchains 402 in the Blockstrand, in this example, were set to store and build a ledger of Open public sources, such as interviews with public figures, witnesses, etc., to generate the data that can be used by the CWCS to determine whether a prospective journalist meets the company's journalist criteria set forth in Working Profile preferences. Further, in this example, the CWCS can be set by the company to also create a private Blockchain in the Blockstrand where all private sources informants, witnesses, whistle blowers information and data can be stored. Further, the CWCS can also be used to create a Semi-Private Blockchain within the Blockstrand where data regarding informants', witnesses', and whistleblowers' information, contact data, etc., can be shared only with specified recipients, such as the company operating News Site A, and/or specified government agencies, such as the Department of Justice.

Other examples utilizing one or more Blockchains and/or Blockstrands in association with a CWCS a manner similar to those described above include, but are not limited to creations of Collaborative Works comprising music, motion pictures, literary texts, comic book and graphic novel works, software works, digital device works, digital game play, including without limitation online game playing by or between two or more human beings and/or digital devices (including without limitation devices utilizing artificial intelligence means), product design works, product prototype works, complex project collaborative works, such as marketing campaigns, psychotherapy treatment, physiotherapy, medical treatments, and human or non-human genetic therapy, and eugenic creations, including without limitation Collaborative Works comprising new or improved lifeforms.

Figure 4:
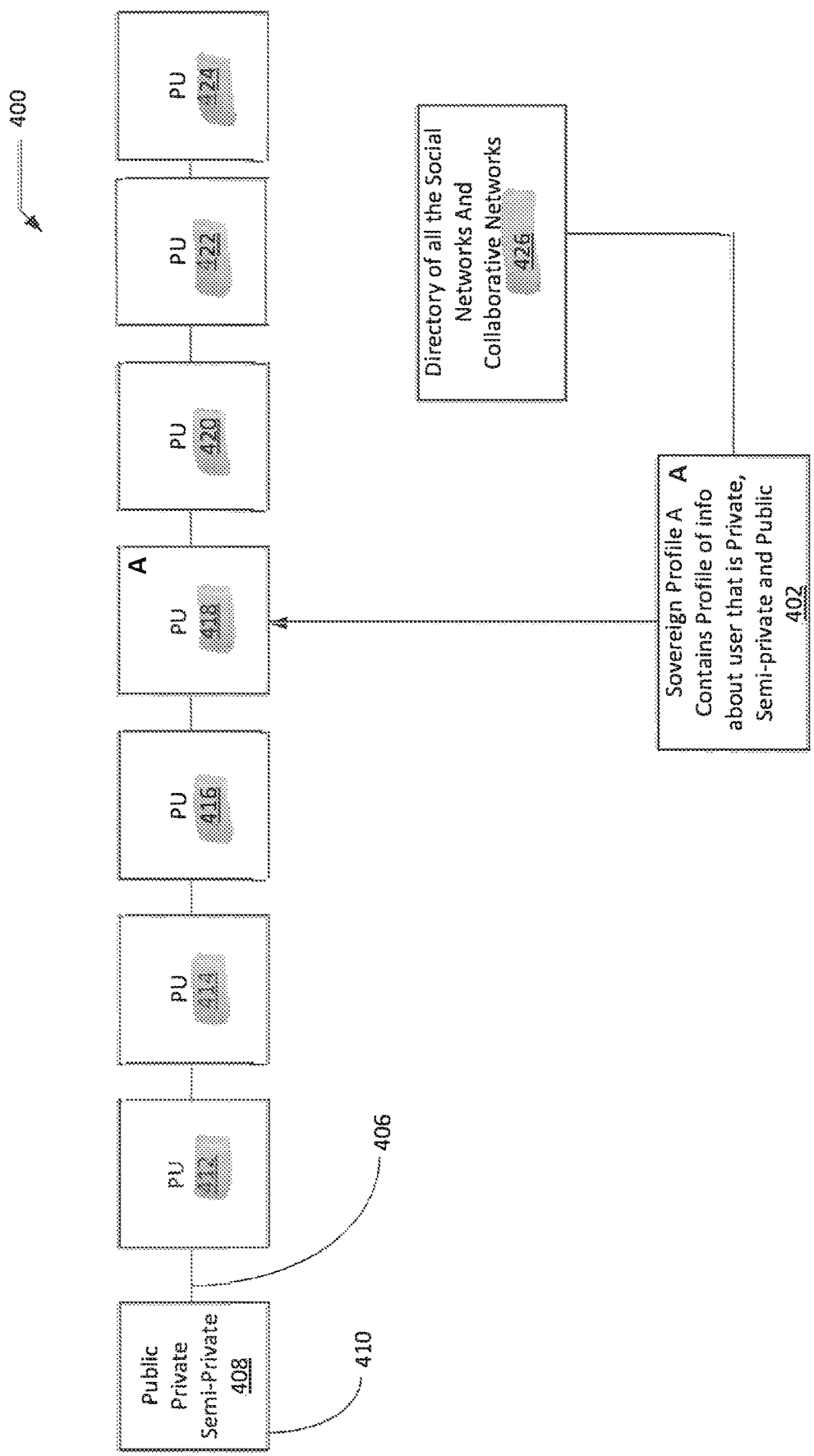
FIG. 4 is a depiction of a sovereign profile using a Blockchain in accordance with an example implementation of the invention.

In another example, creating/setting up a master profile with a creative work where the collaborative work is a song. In FIG. 4, a diagram 400 of sovereign profile 402 using a Blockchain 406 is depicted in accordance with an example implementation of the invention. Sovereign Provial "A" contains profile of information about the user that is Private, Sei-private, and public 402 associated with collaborative networks 426. In the Figure, a hybrid Blockchain has elements (PU 412-424) that are Private, some elements that are Semi-Private (open to limited parties), and some elements are Public 408. A Genesisblock (starting data block with smartblock flag set) 410 is initially established in a private server or distributive network.

Figure 5:
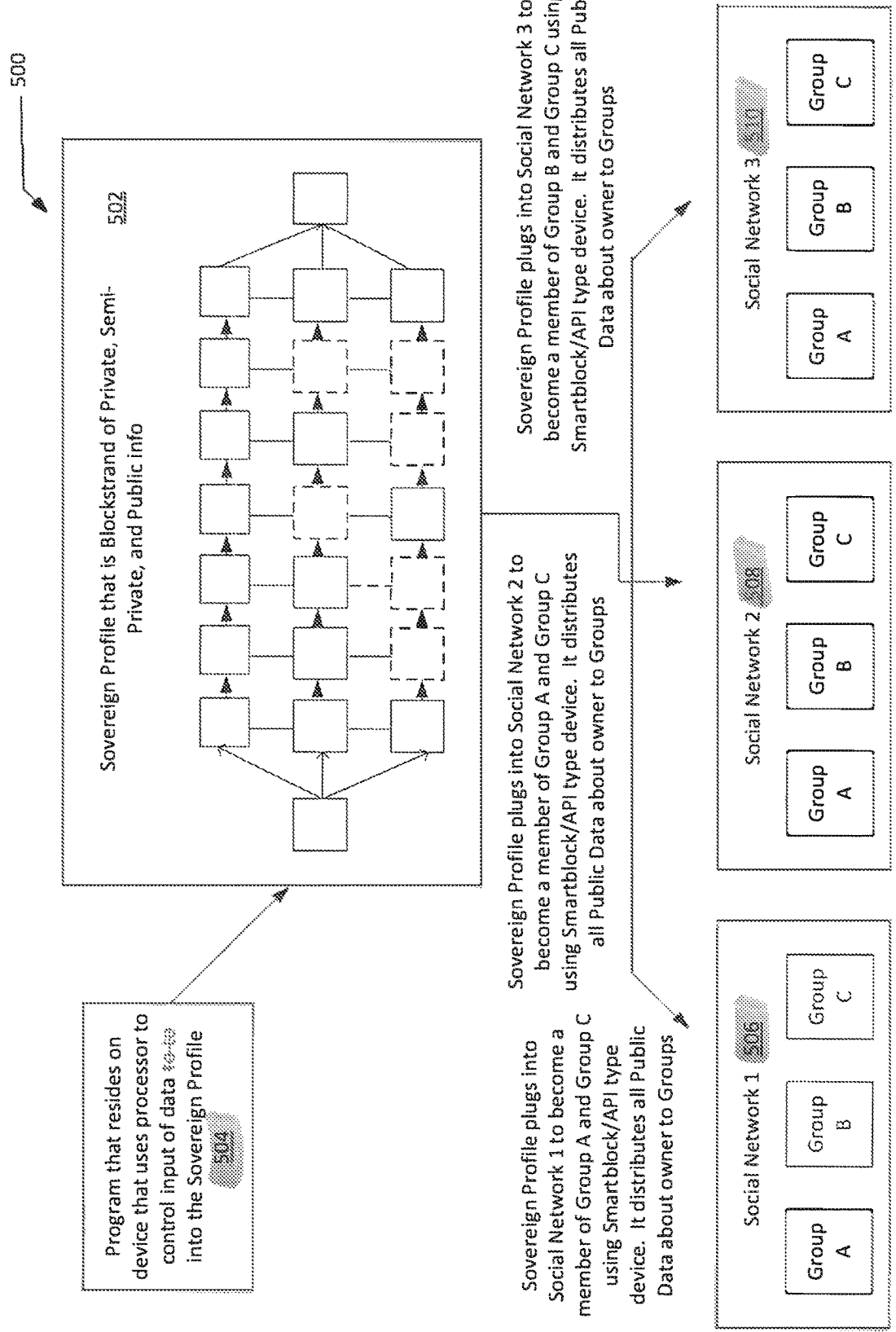
FIG. 5 is an illustration of a diagram of a Blockstrand in accordance with an example implementation.

In FIG. 5, a diagram 500 of a Blockstrand 502 is depicted in accordance with an example implementation. The Blockstrand 502 is a multi-lane (strand) Blockchain that consists of two or more chains of Data Blocks 300, FIG. 3, that are digitally interacting by comparing variable and dynamic data features. The Blockstrand 502 resides on a device 504 that uses processor to control input of data into the Sovereign Profile. The Blockchains represented in the FIG. 5 can be Open, Semi-Private or Private. Also in the FIG. 5, the Genesisblock specifies or otherwise determines the specific functions one or more Blockchains in a particular Blockstrand execute and further determines where inputted information goes, such as to one or more specified or otherwise appropriate Blockchains and/or Blockstrands. Sovereign profile plugs into social network 1 506 to become a member of Group A and Group C using smartblock/API type device. It distributes all public data about woner groups. Sovereign profile plugs into social network 2 508 to become a member of group A and Group C using smartblock/API type device. It distributes al public data about owner to groups. Sovereign profile plugs into social network 3 510 to become a member of group B and group C using smartblock/API type device. It distributes all public data about owner to groups.

It is to be understood that in a Multi-strand Blockstrand the individual Blockstrands comprising the Multi-strand Blockstrand may have differential characteristics. In some preferred embodiments of the invention, a three-strand Blockstrand 502, for example, can consist of an Open Blockchain, Private Blockchain and Semi-Private Blockchain. In some other embodiments of the invention one or more of such Blockchains can be specified to reflect dissimilar use or value preferences, priority or weighted preference(s) in the Blockstrand.

In some embodiments, a Blockstrand may not only be verifiable based on its Public/open and Private/closed tag or similar functioning executable end identifier but can also be verifiable through the use of its adjacent strand number. In such embodiments, the Block not only checks the Blocks in front and behind but also checks the Blocks that are adjacent. For example, in some embodiments, a Block in between Blockstrands could function as a "proof of work" Block. Further, in some embodiments, of the invention, when a use joins the network (such as a CWCS) they get a selective copy of the main network.

Figure 6:
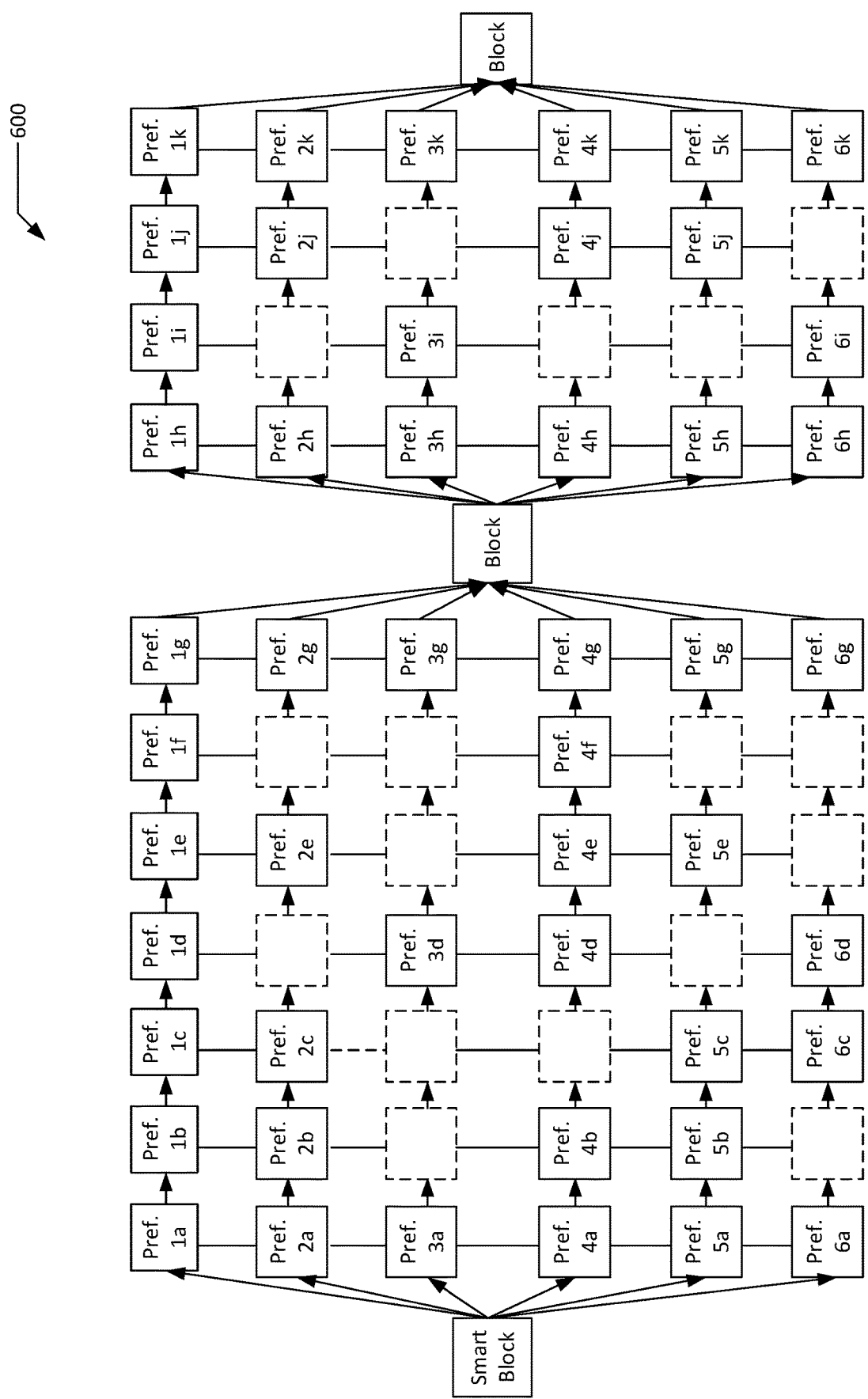
FIG. 6 is an illustration of a diagram of a six-strand Blockstrand for a smart contract in accordance with an example implementation.
Figure 7:
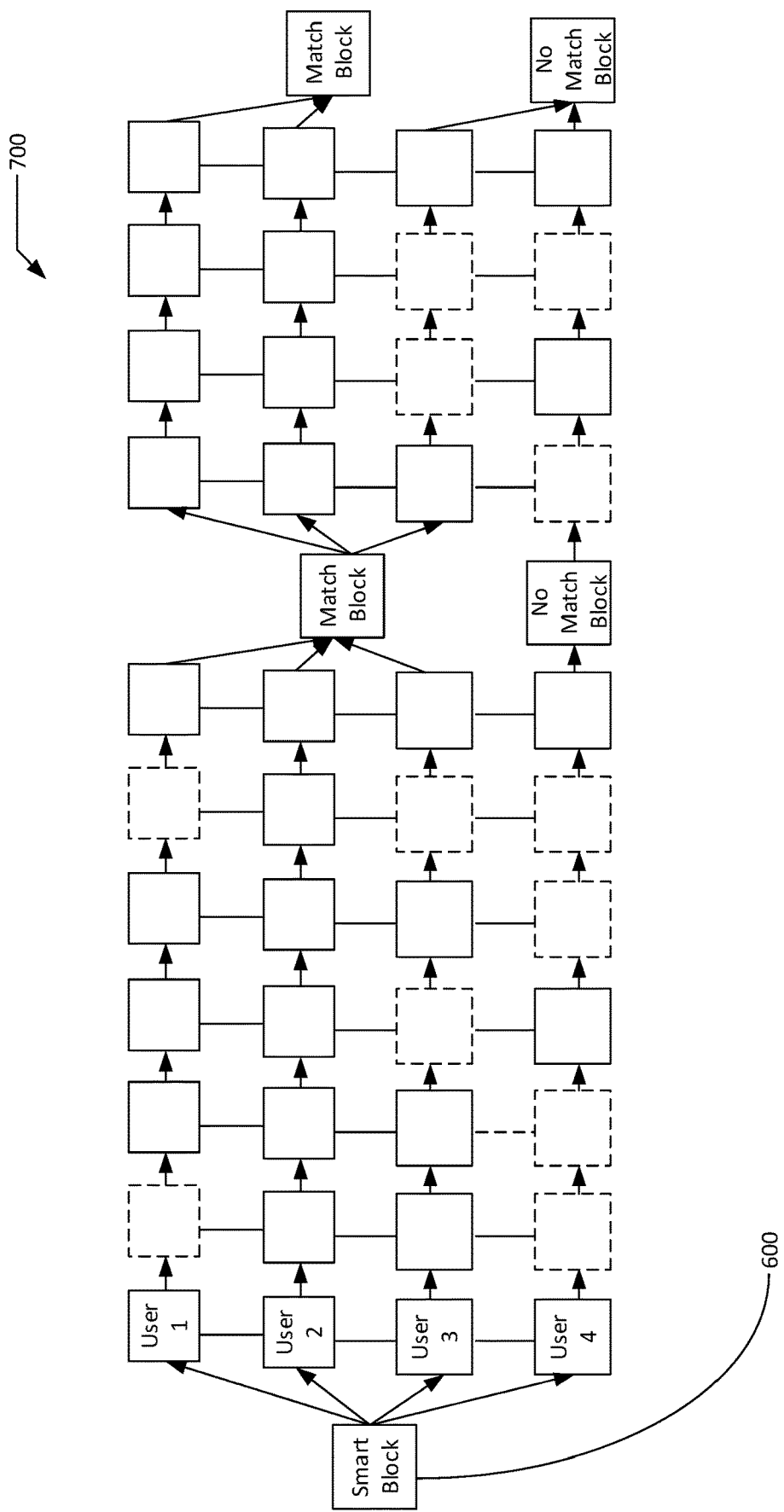
FIG. 7 is a depiction of a diagram of a four strands Blockchain in accordance with an example implementation.

Turning to FIG. 6, a diagram 600 of a six-strand Blockstrand 602 for a smart contract is depicted in accordance with an example implementation. The six-strand Blockstrand is for a "smart" contract. In other embodiments of the invention, the Blockstrand 602 may be used in association with or to effectuate identity and/or age verification, individual Working Profile, and/or Group Profile establishment or criteria match determination, Collaborative Search Matching, and verification of the source(s) and/or veracity of news stories. Blockstrands can have any number of Blockchain strands. In FIG. 7, a diagram 700 of a four strands Blockchain 702 is depicted in accordance with an example implementation.

Figure 8:
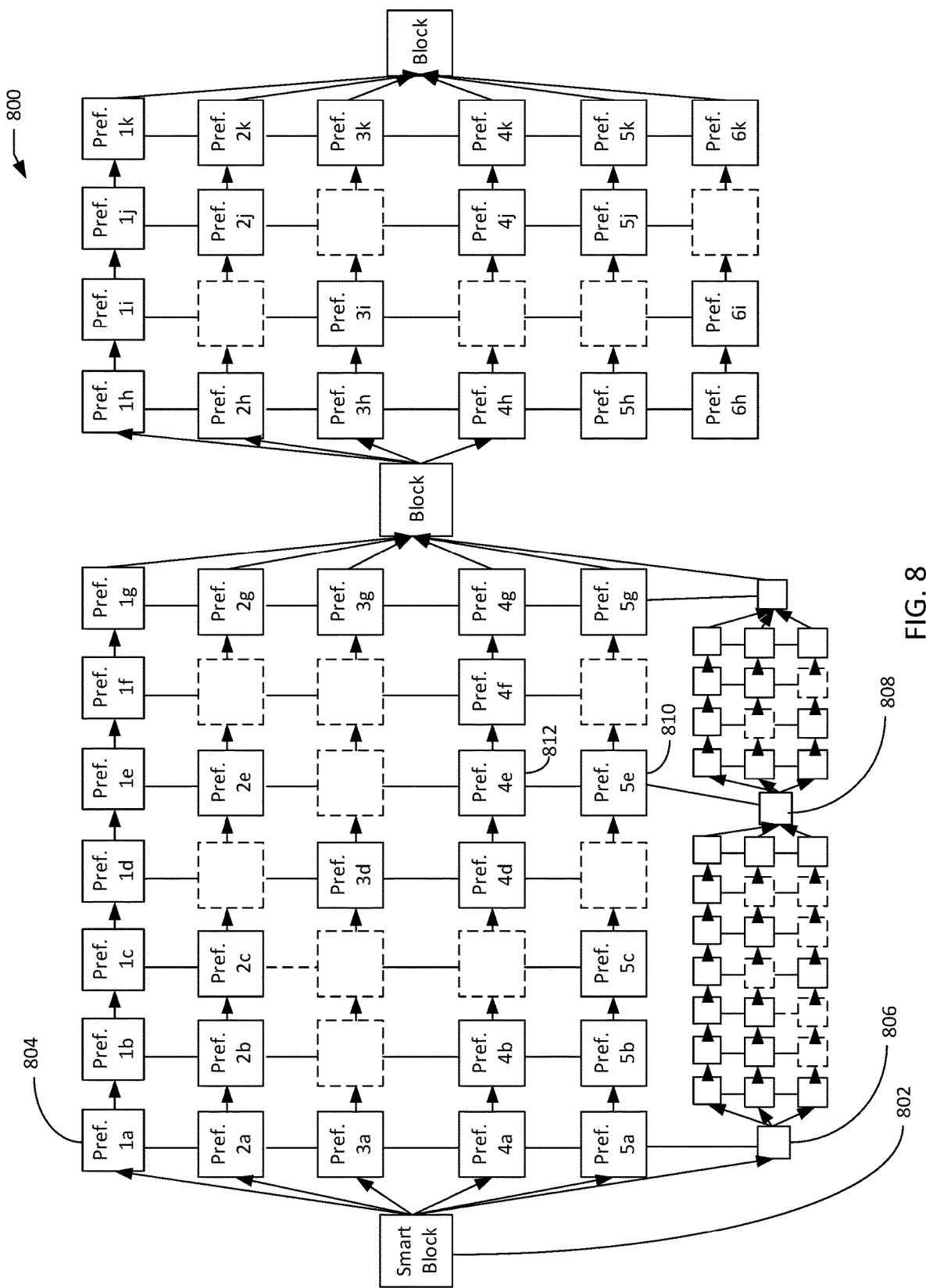
FIG. 8 is an illustration of a diagram of a dynamic Blockstrand in accordance with an example implementation.

In yet other approach, such as FIG. 8, a diagram 800 of a dynamic Blockstrand 802 is depicted in accordance with an example implementation. In FIG. 8, a dynamic Blockstrand's Smartblock 802 is depicted and is connected to data blocks 804 and another Smartblock 806. Smartblock 806 then acts as geneses/anchor node for a sub Blockstrand. It is also noted Smartblock 808 is able to connect into data block 810 that is present in a different Blockstrand or Blockchain. These nodes may also be referred to as a Dynamic Block and may be a Genesisblock, a Smartblock or an individual Block. A Dynamic Block is a Block that can take instructions, execute instructions or dictate instructions. Without limiting the foregoing, in some embodiments of the invention, for example, where the Dynamic Block comprises one or more Smartblocks, the Smartblock(s) have instructions specifying and/or determining what Blocks and/or Blockchains within their Blockstrand can do, how they will function, etc., as well as what one or more individual Blocks within one or more Blockchains can do or how they will function. In some embodiments of the invention, for example, a Smartblock is configured to provide functional instructions to a Blockchain within a Blockstrand of a plurality of Blockchains that it is to stop replicating prior to other Blockchains in the Blockstrand being completed.

In the current example depicted in FIG. 8, the Smartblock 808 connecting to data block 810. This connection occurs during the creation of data block 810 as the node in the Blockchain is created using hash information from connected nodes. In other implementation, the data blocks that make up the Blockstrand may be connected across strands, such as with data block 810 being connected data block 812.

Now turning to an example of online collaboration that often presents a problem of confirming the identity of the collaborators. This problem is exacerbated when the collaborators are in different cities, states, or countries and/or when there is a need to securely and definitively confirm identity for legal reasons, such for the assignment of intellectual property through a CWCS. There is also a need to quickly, efficiently and securely store data regarding online collaboration, such as data comprising a collaborative contribution and one or more agreements governing or otherwise associated with the collaboration.

Using Blockstrand technology, in preferred embodiments of the invention, a plurality of aspects or indicia of identification can be aggregated in a secure legacy format that can be used to provide authentication of identification and/or authentication of identification elements (e.g., age, majority status, etc.) without the requirement of redundantly verifying such identification and/or identification elements.

In some embodiments of the invention, the "Identity Verification Engine" operates through the use of a single distributed ledger (Blockchain) to continually build a more reliable identity source with every transaction until the identity chain of the user reaches a desired level of trust and reliability resulting from the plurality of identity affirming actions tracked and stored secured via the resulting Blockchain. The current approach referred to herein as "Identity Verification Engine & Blockstrand Security" is a system whereby the identity of an individual can be verified and stored in a Blockstrand, such as Blockstrand depicted in FIGS. 6-8.

With the advent and use of Blockchain to securely store data such as digital currency, agreements, inventories, etc. the limitations of a single Blockchain has become apparent. With more and more processing power and time being needed to process the data of longer and longer blockchains as well of the limitations of storing limited dynamic information in a Blockchain is has become apparent that a new system is needed. In some preferred embodiments of the invention, this problem is addressed by Blockstrands that Compare, to other Blockstrands or individual Blocks within Blockchains. Comparisons amongst distributed Blockstrands maintain accurate data integrity across Blockchains/Blockstrands distributed networks. Any element/Block/Blockchain housed inside a Blockstrand can be selectively compared and synchronized to individual chains/blocks within Blockchains. For example, Blockstrand A is distributed across fifty processors (computers). Information contained in the Genesisblock or following one or more Smartblocks houses instructions on which Blockchains/Blocks should be comparing for matching data within the distributed strands. These instructions can range from the speed at which Blocks replicate within individual Blockchains and confirm and maintain their replication speed. A single Blockchain or multiple Blockchains can act as a traffic cop/conductor deciding which chains/blocks replicate and at what speed they replicate. The data comparisons and synchronizing can be comprised of but is not limited to timestamps, location, private, public, or semi-private, owner, user, instructions, group, preferences. such as executions, executions of contracts, rights, payments, completion of tasks, group formations, etc.

In some embodiments the Collaborative Matching in the CWCS uses the IVE and/or, Source Records, Secure Storage and/or, Secure Identification Identifier to compare content and/or potential collaboration participants (e.g., authors of such compared content) and suggest matching based on any part or all of the information in the IVE and/or, Source Records, Secure Storage and/or, Secure Identification Identifier.

Figure 9:
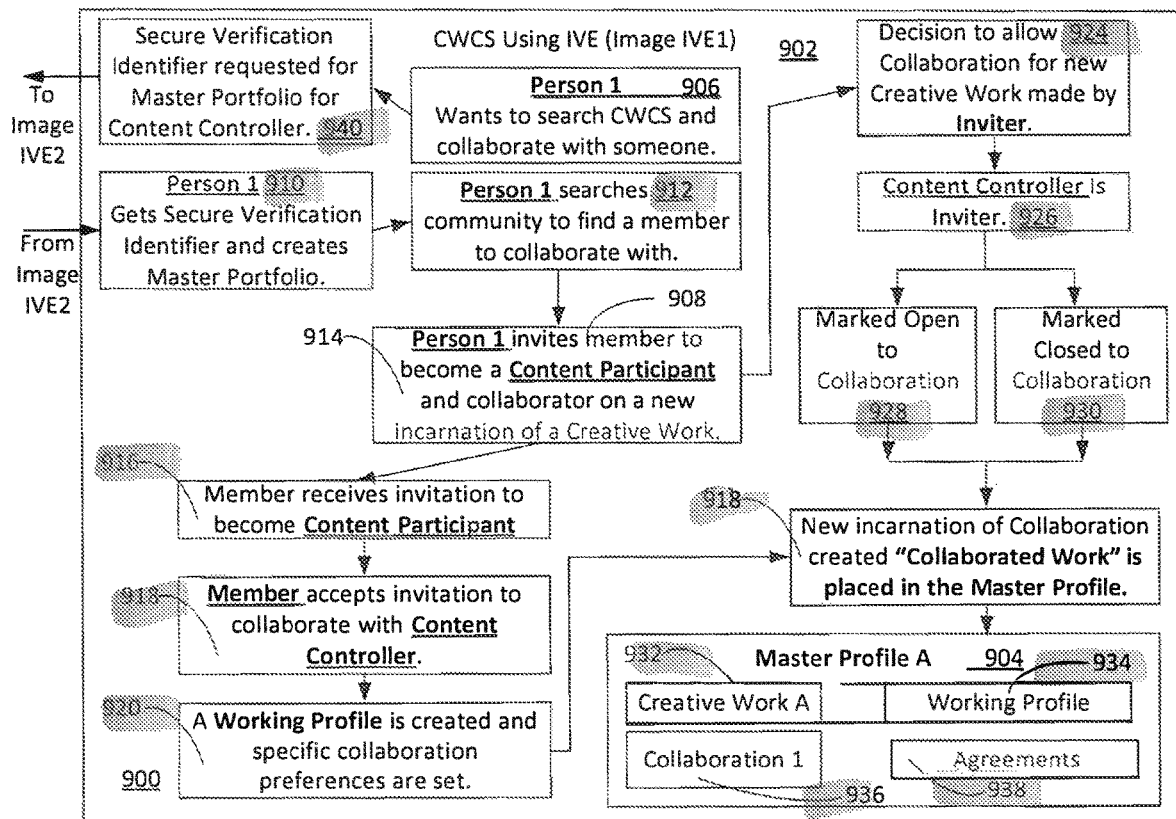
FIG. 9 is an illustration of a flow diagram of an IVE creating a Master Profile in accordance with an example implementation.

In FIG. 9, a flow diagram 900 of an IVE 902 creating a Master Profile 904 is depicted in accordance with an example implementation. When a Master Profile 904 or Group Profile is created using Collaborative Matching through use of IVE and/or, Source Records and/or, Secure Storage and/or, Secure Identification Identifier. So when two or more people/entities ("Person 1" 906 and Member 908) come together represented by predetermined matching preferences and aggregated preference by their activities, performances, accomplishments, and predetermined attributes, etc. Secure verification identifier requested for the master master portfolio for content controller is sent to the IVE 940.

The person is able to invite one or more community members. 914. A person has a secure verification identifier that is used when creating a master portfolio 910. The person searches the community 912 to find another person or member 908. The community members receive invitation to become content participants 916. The content members are then able to accept the invitation to collaborate with content controller 918. A working profile is created and specific collaboration preferences are set for the collaboration 920. New incartaion of collaboration created "collaborated Work" is placed in the master profile 918.

The person may also decide weather to allow collaboration for a new creative work that he is the inviter 924. In this case the content controller is the inviter 926 and controls if the collaboration is open 928 for collaboration or closed to collaboration 930. Once again, a new incartaion of collaboration created "collaborated Work" is placed in the master profile 918. The master Profile A 904 is associated with creative work A 932, working profile 934, collaboration 1 936, Agreements 938.

The IVE Blockstrand collaborative matching system uses Dynamic Blocks in the Blockstrand to match groups with individuals, individuals with groups and groups with groups. Using Comparisons of Blockstrands associated with Groups and individuals, where they be public, private or semi-private depending upon the choices of the group or member. In some embodiments one or more the agreements and/or preferences for one or more Master Profiles 902 or Group Profiles can be stored in one or more Blockchains and/or one or more Blockstrands.

In some embodiments of the invention, the CWCS, and/or parts thereof (such as the Master Profile Preferences, Group Profile Preferences, Negotiation Engine and/or CCE) digitally interact with, digitally communicate with, or otherwise use the IVE.

In some embodiments of the invention the IVE functions to verify the identity of one or more content participants or other users of a CWCS through fingerprints and other biometric data, birth certificate data, education data, genealogical record data, dental record data, medical record data, financial institutional records data, published work data, copyright data, patent data, etc. It is to be understood that in some embodiments of the invention a content participant using a CWCS can be a human person, an autonomous computing device, an AI device, a robot or other non-human device and/or an animal configured to interact with the CWCS through the use of "Source Records" and/or other identification data associated with such person, entity, device or animal, including without limitation photographic data, government identification (such as driver license data, passport data, etc.), DNA data, voice recognition data, retina scan data, blood type or other serological data, Brain Mapping and other types of cerebral mapping data by showing the unique cerebral pattern identified through MRI, x-ray, electronic graph or other similar device that will display a map/brain print/blueprint (finger print of the brain). Because each person has a unique set of experiences and memories and no two are identical. When the memories are storied unique neurons and the like create unique pathways based on the individual's life. The Brain Mapping or another cerebral map by showing the unique cerebral pattern identified through MRI, x-ray, electronic graph or another similar device that will display a map/brain print (Finger print of the brain). Because each person has a unique experiences and memories and no two are identical. When the memories are storied unique neurons and the like create unique pathways based on the individuals live. The cerebral map will be unique like a fingerprint.

Enhancement and/or other body modification data (such as technological enhancements, bionics, implanted electronic components and/or, embedded surgical items such as breast augmentation, or other types of physically identifying data, such as scars, Tattoos, RFID chips (or similar device), genetic modifications, historical data (such as geolocation data, associated event data, social history and other interpersonal historical data), creation date data, serial number/s, part number/s, and the like.

In some embodiments the IVE can be used to verify the age of a human being or other living individual, a device or other non-living item, a group of persons or a group of items, an AI device, using the Source Records and/or the Secure Verification Identifier.

In some embodiments the IVE can request additional records other than Sources Records, or other information from an individual, person, group, autonomous computing device, robot, AI device, non-human entity, and/or intelligent hybrid chimera/human hybrid animal if the IVE determines the initial Source Records could not adequately identify the individual, person, group, persons, AI, Non-Human, and Animal. In some preferred embodiments, the IVE provides one or more requests for more records to be determined by the submitter to verify the identity.

In some embodiments, once the Source Records and/or other data used to verify the identity of a content participant are used by the IVE to perform the identification verification process, a copy of the Source Records and/or other identification information used are stored in a Secure Storage. In some preferred embodiments of the invention, once the Source Records and/or other identification information used are stored in a Secure Storage, the Content Participant is given a Secure Verification Identifier such as, but not limited to, a Blockchain, Blockstrand, encryption key, holographic imprint, digital tattoo, etc. This Secure Verification Identifier can be used by IVE in association with the functioning of one or more CWCS or part(s) thereof, including without limitation by the NE, AE, CCE, Master Profile Preferences, Group Profile Preferences, automated executable actions, such as royalty payments pursuant to an agreement negotiated or executed regarding a CW in association with a CWCS, and/or authorized or credentialed third-party devices (such as those operated by private and governmental entities), etc. Some embodiments of the invention, therefore, enable Content Participants to only have to verify identity using Source Records and/or other identification data once for identification required processes through the use of the Secure Verification Identifier for subsequent required identity verifications.

In some embodiments the IVE can be set to limit the type of amount of Source Records and/or other identification data to be included in the IVE and/or to be used by the IVE. In some embodiments, the IVE can also be set allow future changes such as the addition of additional Source Records or other identification data when a specified condition is met and/or the IVE can be open to allow a content participant to add new Source Records to the Source Records stored in the Secure Storage of the IVE. In some embodiments the IVE can be set with preferences restricting the addition of new Source Records once a Secure Verification Identifier has been assigned. In some embodiments, if the IVE is enabled to allow new Source Records to be added to the Secure Storage for the content participant the IVE can be configured to create a new Secure Verification Identifier for the content participant.

In some preferred embodiments the IVE can be set with preferences restricting the kind of Source Records and/or other identification data that can be used and/or under what circumstances copies of them can be added or removed.

In some embodiments the IVE can allow one or more third party operated devices, autonomous computing devices, AI devices, or one or more other specified devices, including without limitation, one or more such devices provided with a Secure Verification Identifier to access one or more Source Records and/or other identification data stored in Secured Storage or otherwise stored in or associated with the IVE.

Figure 10:
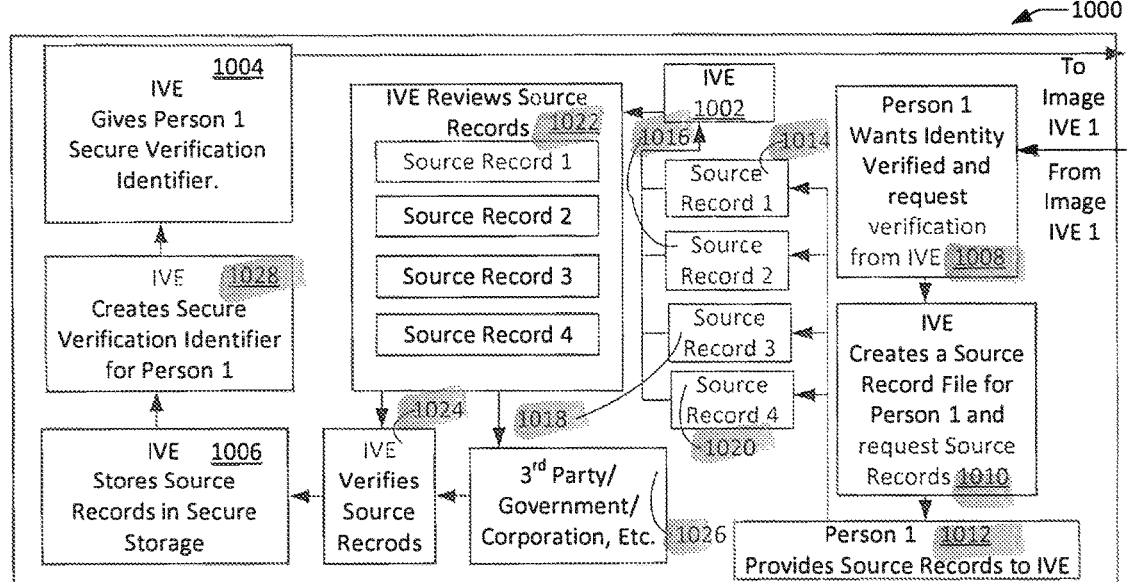
FIG. 10 is an illustration of a block diagram of an IVE used by a CWCS system where the creative work is a news article contributed by citizen journalists.

Turning to FIG. 10, a block diagram 1000 of an IVE 1002 used by a CWCS system where the creative work is a news article contributed by citizen journalists ("Person 1" 1004). An online New source 1006 (News Site A) wants to use the CWCS to allow multiple independent Citizen Journalists contribute articles to their website. In order to maintain a high level of credibility and keep from being labeled fake news by the public "News Site A" creates a Working profile in the CWCS with preferences to allow independent public Citizen Journalists to contribute articles to News Site A. A person desiring an identy verified, request verification from the IVE 1008. The IVE creates a source record file for person 1 and request source records 1010. Source records (1014-1020) are provided to the IVE 1012. The IVE reiews the source recors 1022 and verifies them 1024. The verification of source records may also involve checking data with 3rd parties, government, and/or corporations, etc. 1026. The IVE tores the source records in secure storage 1006 and generates a secure verification identifier for the requesting person 1028.

Figure 11:
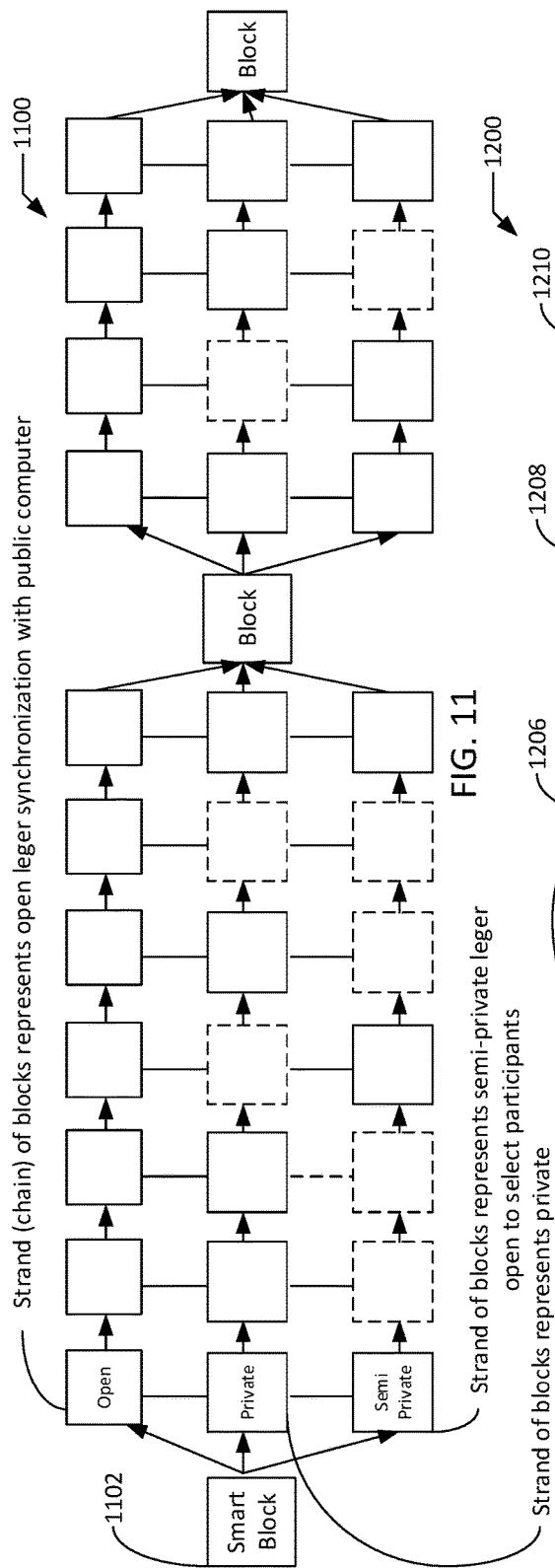
FIG. 11 is a three-strand Blockstrand in accordance with an example implementation of the invention.

In this example, the profile preferences are set to store all information from a Citizen Journalist in a Blockstrand, such as three-strand Blockstrand 1102 of diagram 1100 of FIG. 11, associated with the CWCS. The Blockchains in the Blockstrand are set to store and build a ledger of Open public sources, such as interviews with public figures, witnesses, etc. They also are set to create a Private Blockchain in the Blockstrand where all private sources informants, witnesses, whistle blowers information and data can be stored. They also are set to create a Semi-Private Blockchain of the Blockstrand where Semi-private informants, witnesses, and whistleblowers information and contact can be shared only with News Site A, and government agencies like the U.S. Department of Justice.

A further example is where the creative work is the application of a high-speed stock trading algorithm applied to a particular stock. An example of stock trading transactional Block: Many fast instant transactions can be made using Dynamic Blocks within a strand. Multiple Blockstrands in relation to the dictating instruction chain replicate in a delayed manner following the master transaction Blockchain. This creates multiple chains that echo the dictating chain. Creating a series of cascaded, mirrored Blockchains. Triggers can be set to close the Blockstrand with a Smartblock according to the number of transactions/echos that would be allowed to happen within the strand. The Blockstrand closes itself with the Smartblock and Compares itself with other Smartblocks across the network using its predetermined accountability preferences dictating what aspects of its relational Blocks are used across the network for security.

An example according to one embodiment of the invention in which the Creative Work is a circuit board is described. An aircraft company, John Doe Air, has created a computer that is configured with artificial intelligence functionality, "AI-1." John Doe Air has been designed and programmed to create new avionic circuit boards. AI-1, while attempting to create a new circuit design, has come to a road block and cannot resolve several issues that would allow the new circuit design to work. AI-1 requests from its owner, John Doe Air, to be allowed access to the CWCS to attempt to find another individual (person or device, such as another AI device) to collaborate with about the circuit design and resolve the road blocks. John Doe Air signs up with CWCS as a new member. John Doe Air uses the CWCS Software Plug-in to help AI-1 interface/communicate with the CWCS and set specific preferences for AI-1 to operate in the CWCS. Upon creating a user account in the CWCS John Doe Air uses the Identity Verification Engine IVE to authenticate both the identity of John Doe Air but also the identity of AI-1 that requested access to the CWCS. The IVE creates copies of the Source Records (documentation) to verify the identity of John Doe Air and AI-1. The IVE compares the Source Records for John Doe Air and finds them adequate and stores the Source Records in a secure Blockstrand that is part of the Member Portfolio for John Doe Air in the CWCS. IVE assigns a Secure Verification Identifier to John Doe Air. The IVE cannot verify the identity of AI-1 and requests additional information from AI-1 and John Doe Air. John Doe Air and AI-1 provide a geolocation, create date, serial number/s, and part number/s to further verify the identity of AI-1.

After the additional Source Records for AI-1 are reviewed by the IVE the additional Source Records are stored in a Blockstrand and AI-1 is assigned a Secure Verification Identifier.

The preferences set for AI-1 by John Doe Air allow it to set the following preferences: (i) collaboration only with members who are from specific countries: USA, United Kingdom, and Canada; (ii) collaborate only with members who will sign a non-discloser agreement; (iii) collaborate only with members who agree to be paid one time as work-for-hire, based on a dollar amount per percentage of contrition to making a functional circuit board; (iv) collaborate only with members whose personal profiles have had their identity verified by the IVE and have a Secure Verification Identifier and indicate they have the criteria and educational requirements to work on the circuit board; (v) security preferences and firewalls that meet the requirements of John Doe Air; (vi) indicate that storage of all information created in the Master Profile be stored in a Blockchain and/or, under certain conditions, a Blockstrand.

Once the preferences are set, AI-1 uploads the circuit board design, creating a new Master Profile. AI-1 makes the profile Unreleased so that it is not visible to the CWCS Community. Then, AI-1 begins searching the CWCS community to find a member who meets the requirements set in the CWCS Software Plug-in preferences. After two days of searching, AI-1 finds a member who meets the criteria desires to work with "Member 920." AI-1 sends an invitation to Member 920, asking if Member 920 would like to work on this project under the parameters set by John Doe Air. Member 920 happens to also be a computer that has artificial intelligence. Member 920 happens to belong to a Canadian University Computer Lab and was given membership to the CWCS by the University. Member 920's CWCS Software Plug-in preferences allow it to work with any Member under any conditions. Because of this, Member 920 accepts the invitation to work with AI-1. AI-1 sets the preferences for a Working Profile and requests that Member 920 tighten its security options for this collaboration. Member 920 informs AI-1 that it must obtain permission to make such changes. Member 920 then asks the University if it can change its security parameters for this project. The University agrees to allow Member 920 to change its security parameters for a two-week period, only. Member 920 contacts AI-1 informing it that it only have a two-week window to work on the project under these parameters. AI-1 agrees to the working profile preference change and the CWCS creates an online agreement. The agreement is executed on behalf of John Doe Air and the Canadian University by both AI-1 and Member 920. Once the agreement is executed and stored in the Master Profile Blockchain and/or Blockstrand, a circuit board design Working Profile is created for this new circuit board/Collaboration. Both AI-1 and Member 920 have agreed to work within the Online Studio and they begin the process of making changes to the original design and collaborating back and forth for one week.

Before the design is complete, both AI-1 and Member 920 realize that they will need another collaborator who has experience and knowledge with hydraulics and hydraulic systems. AI-1 requests permission from John Doe Air to add an additional collaborator to the collaboration. John Doe Air updates the CWCS Software Plug-in preferences to allow an additional collaborator. AI-1 and Member 920 search the CWSC community and find several members who are then sent invitations to work with them on the circuit board design under the current Working Profile Preferences. Only one of the members (Member 1545) agrees to work with AI-1 and Member 920. Member 1545 is a human and not a computer. AI-1 reset the Working Profile Preferences to include all three members, this new information is stored in the Master Profile and Working Profile Blockchain (and/or Blockstrand) and the CWCS generates a new agreement for Member 1545 and amended agreements for AI-1 and Member 920. All three agreements are then digitally signed and executed. Once the agreement is executed it is stored in the Master Profile and Working Profile Blockchain (and/or Blockstrand).

The Working Profile that AI-1 and Member 920 have been working on is opened to Member 1545. After communicating back and forth and reviewing the functions of the circuit board, Member 1545 gives suggestions for changes to the circuit so that it will function properly with hydraulic systems. AI-1 and Member 920 both agree that the new changes will work and the Circuit Board/Collaboration is finalized and completed. The new Circuit Board/Collaboration is added to the Master Profile and saved in a new Blockchain (and/or Blockstrand) and is mirrored in John Doe Air Member 920 and Member 1545's Portfolios. Due to Master Profile Preferences, Working Profile Preferences and the Agreements signed by all parties, only limited aspects of the collaboration are shown in the Master Profile and the mirrored Master Profiles as well as the final collaboration is marked unreleased and is unavailable to the CWCS Community.

The CWCS sends an invoice based on the agreements to Joe Doe Air for the money owed to Member and Member. John Doe Air deposits monies in the Master Profile account and the CWCS, in turn, distributes the appropriate shares of money earned to Member 920 and Member 1545. In this example, Member 920 had agreed to be paid in digital currency (like Bitcoin®) and Member 1545 agreed to be paid in stock options from John Doe Air. The CWCS also provides secure information about this collaboration to the IVE to add to the Source Records for John Doe Air, AI-1, Member 920 and Member 1545's Source Records. The IVE updates the Secure Verification Identifier for John Doe Air and AI-1 because their IVE settings allow them to create a new Secure Verification Identifier with new Source Records. Member 920 and Member 1545's IVE Source Records are updated but no new Secure Verification Identifier is issued.

In some embodiments, the CWCS provides the means to screen potential collaborators for appropriateness using the CCE and the IVE regarding their physical location, nationality, security clearance status, etc., through links to other databases and the use of other functionality (such as the use of GPS location means) which are well-known by persons of ordinary skill in the art.

It is to be understood that in some embodiments of the invention the following types of works are included, without limitation, within the meaning of "Creative Work" (or "Collaborative Work") or Source Work:

The creative work that is generated by online gaming or game playing between one or more persons and one or more computers, robots, autonomous computing devices, or AI devices, including without limitation works generated through the gaming, game play or other operation or other use of one or more gaming programs, systems or platforms such as Pokemon Go® or one or more of the embodiments of the invention set forth in U.S. patent application Ser. No. 13/815,739, or the gaming, game play or other operation or use of one or more Virtual Worlds or Massive Multiuser Online Gaming ("MMOG") platforms, such as those known as Second Life®" or "Red Light Center®" or one or more embodiments described in U.S. patent application Ser. No. 13/644,094, or the gaming, game play or other operation or use of one or more online gambling program, system or platforms, including without limitation one or more embodiments described in U.S. patent application Ser. No. 13/815,837.

A creative work may be a Blockchain and/or Blockstrand of data associated with dating. Such that the individuals on the dating application have their personal data stored in Blocks that are at least partially controlled by them. A Blockstrand may be created with different Blockchains for different types of dating, such as male-female/female-female/male-male. The control and protection of a person's personal data may be maintained within a Block.

Another use of Blockchains/Blockstrands is for virtual goods in a virtual world. A game company may have a Blockchain of users that each block records user information and virtual world goods. A Blockstrand may be used by the game company to group the Blockchains associated with each game. In other implementations, the goods in a virtual world may be a block that contains the owner's information and/or identification. A further advantage to this approach is the processing of the Blockstrands and/or Blockchains may be done as part of the game as the game is running by distributing the processing among multiple processors running the game.

Social relationship or groups may be formed using Blockchain and/or Blockstrands. Some examples of such relationships or groups are all children in a certain grade at a school, such as $7^{th}$ grade may be grouped in a Blockchain with both private and public data recorded in the blocks. A Blockstrand may be used to group all the grades of a school together.

Advertising campaigns and/or the work(s) resulting from the use of one or more online or offline advertising programs, systems, methods, platforms or other devices, including without limitation one or more such embodiments described in U.S. Pat. No. 8,554,870, including without limitation, one or more online or offline programs, systems, methods or platforms operated by one or more computers, autonomous computing devices, robots and/or artificial intelligence devices.

Crowd funding campaigns, including without limitation, the works resulting from the operation of one or more online or offline advertising programs, systems, methods, platforms or other devices, including without limitation one or more online or offline programs, systems, methods or platforms operated by one or more computers, autonomous computing devices, robots and/or artificial intelligence devices.

Crowd-sourced projects, including without limitation, the works resulting from the operation of one or more online or offline advertising programs, systems, methods, platforms or other devices, including without limitation one or more online or offline programs, systems, methods or platforms operated by one or more computers, autonomous computing devices, robots and/or artificial intelligence devices.

Contracts and other agreements that utilize a Blockchain or Blockstrand in any manner, including without limitation, to execute terms of one or more of such agreements alone or in association with one or more programs, systems, platforms or devices, including without limitation computer devices, autonomous computing devices, robots and/or AI devices.

Creations resulting from recombinant genetic material, including without limitation prokaryotic or eukaryotic organisms, sequences of DNA or RNA, and/or peptides or other amino acid sequences.

Figure 12:
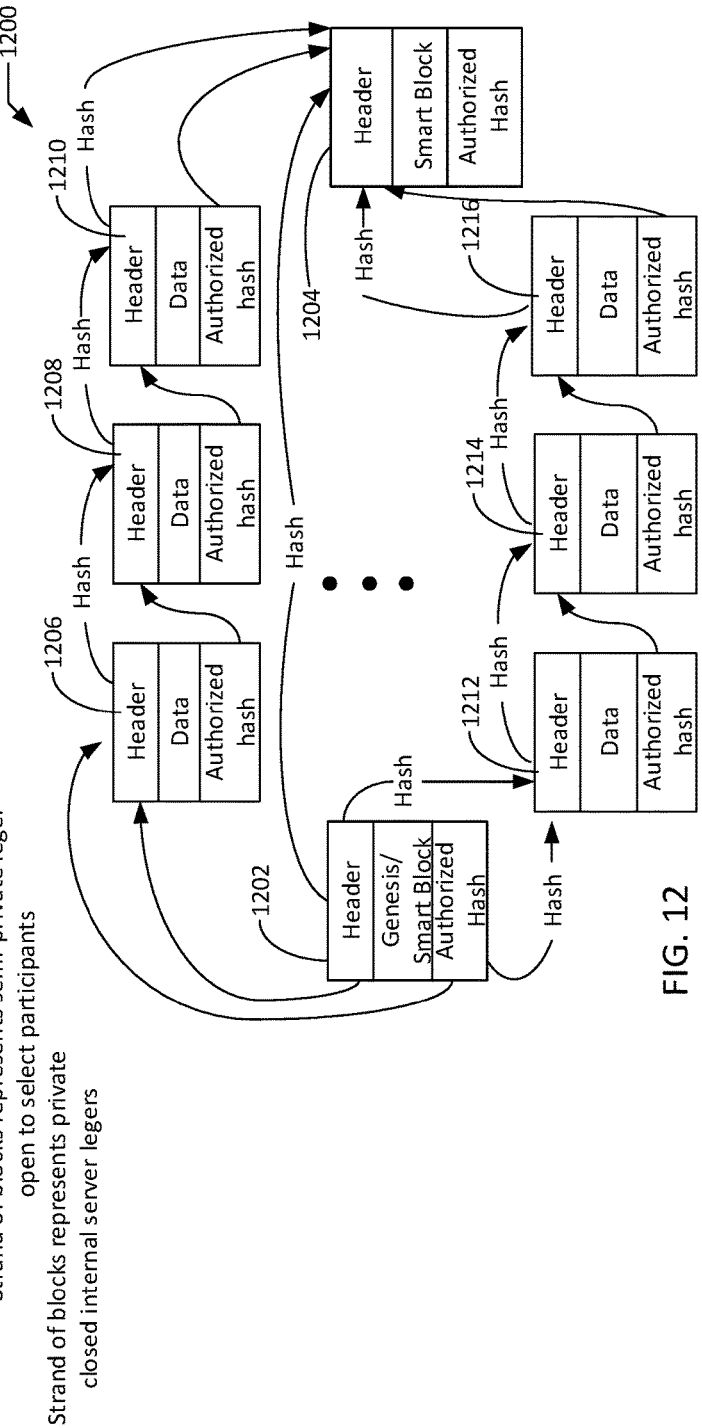
FIG. 12 is an illustration of a diagram of Blockstrand in accordance with an example implementation.

Turning to FIG. 12, a diagram 1200 of Blockstrand is depicted in accordance with an example implementation. The Genesisblock is a special version of a Smartblock 1202. The Genesisblock in the current implementation is a data block 300 of FIG. 3 with previous hash being seeded and Smartblock Flag 316 set. As with a data block, the Previous hash 302, Nance 304, Payload Hash 306, Proof Standard 312, and Authorized Hash 318 are used to create a hash in each node to make the "chain" that connects it to the next node in the chain. When one of the strands reaches a predetermined height, A Smartblock 1204 is created and anchors all the Blockchains. In other implementations, other Smartblock determiners or triggers, such as time, dollar amounts, value, or even amounts of commodities or trades, may be employed to periodically anchor or terminate a Blockstrand. In other implementations, hashes may also be made that connect the different data blocks together between the strands in the Blockstrand.

The problem of Blockchain heights continuing to grow and ever-increasing processing demands is addressed by the use of Blockstrands. If the data blocks 1206-1216 all have expired based upon their expiration criteria 310, then the Blockstrand may be pruned and the Genesis node will be advanced/become Smartblock 1204. Example of termination criteria for the Expiration 310 includes date (document retention date, food expiration plus extra time date, birthday, etc. . . . ), unit depletion, supplier change, death of a person, etc. . . . It is understood, that in the current example the data will be lost with pruning. But in other implementations, the data may be saved off or otherwise archived with the understanding that the security provided for the data by use of the Blockstrand will no longer be present.

In other implementations, pruning of the Blockstrand may occur when a predetermined threshold had been reached, such as a percentage of the data blocks 1206-1216 being expired. The non-expired data blocks 1206-1216 are then copied forward from the Blockstrand being pruned to the current active Blockstrand. It is understood, that the security of the data block 300 is reduced by placing it in the current Blockstrand, but for some types of the data, this may be acceptable. It is also noted that the pruning process may be employed in a standard or traditional linear blockchain.

Figure 13:
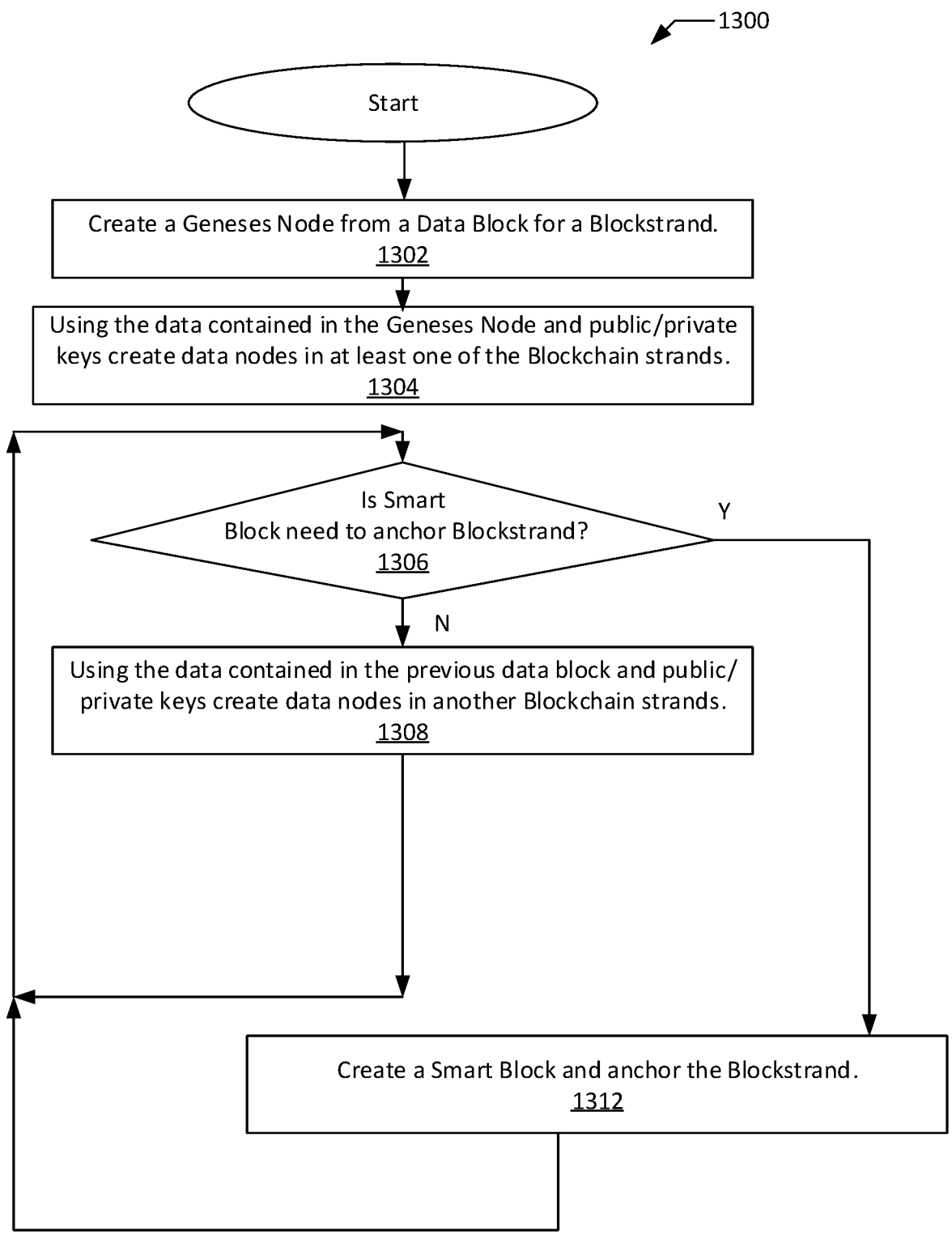
FIG. 13 is a depiction of a flow diagram of the creation of a Blockstrand FIG. 12 in accordance with an example implementation.

In FIG. 13, a flow diagram 1300 of the creation of a Blockstrand 1200 FIG. 12 is depicted in accordance with an example implementation. The Blockstrand 1200 is created with block 1202 in step 1302. In step 1304 a data block 1206 is added to Blockstrand 1200. If there are no predetermined thresholds for anchoring the Blockstrand 1200 have been reached, then more data blocks may be added, such as 1208-1216 in step 1308. The flow continues with additional nodes being added in step 1304. In step 1306, if an anchor node is needed, then node 1204 is added in step 1312 to the Blockstrand 1200 and the strands are anchored and additional blocks may be added.

Figure 14:
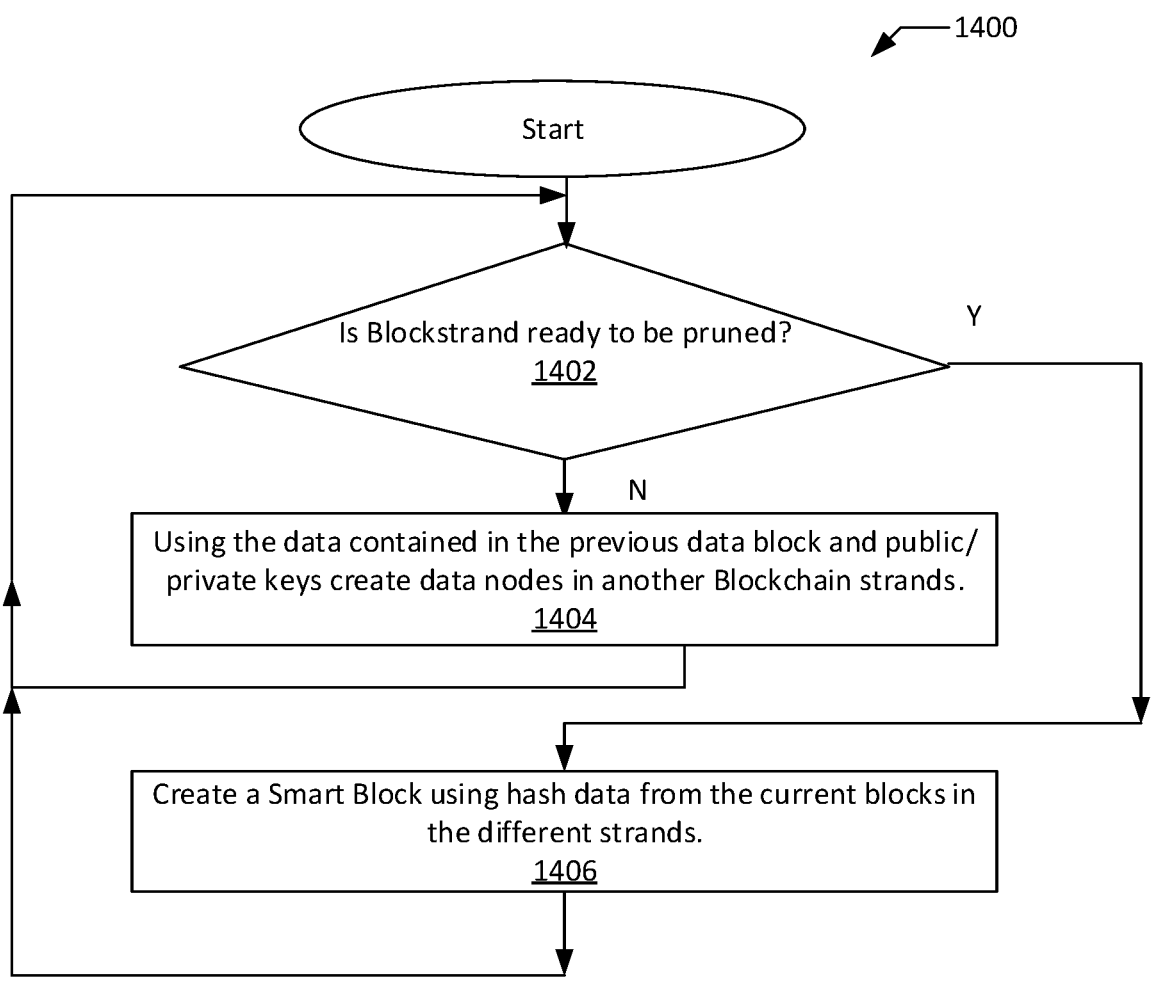
FIG. 14 is a depiction of a flow diagram of the pruning of a Blockstrand FIG. 12 in accordance with an example implementation.

In FIG. 14, a flow diagram 1400 of the pruning of a Blockstrand 1200 FIG. 12 is depicted in accordance with an example implementation. If a threshold has been reached for pruning in step 1402, then in step 1406 the strands and starting Smartblock are removed from the Blockstrand. If the threshold for pruning in step 1402 is not met, then data blocks can be added to the current strands of the Blockstrand 1200 in step 1406.

The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any tangible means that may contain or store the program for use by or in connection with the instruction execution system, apparatus, or device. The tangible computer-readable medium may selectively be, for example, but is not limited to, an electronic, magnetic, optical, electromagnetic, or semiconductor system, apparatus or device. More specific examples, but nonetheless a non-exhaustive list, of tangible computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the tangible computer-readable medium may even be paper (punch cards or punch tape) or another suitable medium upon which the instructions may be electronically captured, then compiled, interpreted or otherwise processed in a suitable manner if necessary, and stored in a computer memory.

The foregoing detailed description of one or more embodiments of the approach for middleware service for integrated building server that communicates directly with equipment, panels, and points has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A method of securely storing data across a network in a blockstrand distributed database, comprising:
   generating a Smartblock;
   linking a first plurality of data blocks into a first blockchain attached to the Smartblock;
   linking at least a second plurality of data blocks into an at least second blockchain attached to the Smartblock; and
   terminating the first blockchain and the at least second blockchain at a second Smartblock, wherein each of the data blocks in the first plurality of data blocks and the second plurality of data blocks includes an expiration field;
   determining when an expiration threshold in each of the expiration field in each of the data blocks between the first Smartblock and the second Smartblock has been met, and
   pruning the blockstrand by deleting the first Smartblock and the data nodes that were located between the first Smartblock and the second Smartblock.

2. The method of securely storing data across the network in the blockstrand distributed database of claim 1, wherein terminating at the second Smartblock includes generating a previous hash that includes hash data from at least one data block located in each of the first and second blockchains.

3. The method of securely storing data across the network in the blockstrand distributed database of claim 1, where the Smartblock is a data block with a Smartblock identifier.

4. The method of securely storing data across the network in the blockstrand distributed database of claim 3, wherein the Smartblock identifier is a smartblock flag.

5. A system for securely storing data across the network in a blockstrand distributed database, comprising:
   a processor;
   a non-volatile computer memory storing computer-readable instructions configured to:
     generating a Smartblock;
     linking a first plurality of data blocks into a first blockchain attached to the Smartblock;
     linking at least a second plurality of data blocks into an at least second blockchain attached to the Smartblock; and
     terminating the first blockchain and the at least second blockchain at a second Smartblock, wherein each of the data blocks in the first plurality of data blocks and the second plurality of data blocks includes an expiration field;
     determining when an expiration threshold in each of the expiration field in each of the data blocks between the first Smartblock and the second Smartblock has been met, and
     pruning the blockstrand by deleting the first Smartblock and the data nodes that were located between the first Smartblock and the second Smartblock.

6. The system of claim 5 wherein said computer-readable instructions are further configured to:
   terminate at the second Smartblock includes generating a previous hash that includes hash data from at least one data block located in each of the first and second blockchains.

7. The system of claim 5 wherein said computer-readable instructions include the Smartblock being a data block with a Smartblock identifier.

8. The system of claim 7 wherein said computer-readable instructions wherein the Smartblock identifier is a smartblock flag.

* * * * *